US007010512B1

(12) United States Patent
Gillin et al.

(10) Patent No.: US 7,010,512 B1
(45) Date of Patent: Mar. 7, 2006

(54) TRANSFER INSTRUMENT

(75) Inventors: Matthew J. Gillin, Rosemont, PA (US);
Roger Korfmann, Radnor, PA (US);
Paul L. Raden, Phoenixville, PA (US)

(73) Assignee: C/Base, Inc., Conshohocken, PA (US)

( * ) Notice: Subject to any disclaimer, the term of this patent is extended or adjusted under 35 U.S.C. 154(b) by 0 days.

(21) Appl. No.: 09/188,810

(22) Filed: Nov. 9, 1998

(51) Int. Cl.
*G06F 17/60* (2006.01)
(52) U.S. Cl. .......................................... 705/39; 705/35
(58) Field of Classification Search .................. 705/26, 705/35–40
See application file for complete search history.

(56) References Cited

U.S. PATENT DOCUMENTS

| | | |
|---|---|---|
| 4,305,059 A | 12/1981 | Benton |
| 4,960,981 A | 10/1990 | Benton et al. |
| 4,977,595 A | 12/1990 | Ohta et al. |
| 5,350,906 A | 9/1994 | Brody et al. |
| 5,373,558 A | 12/1994 | Chaum |
| 5,426,594 A | 6/1995 | Wright et al. |

(Continued)

FOREIGN PATENT DOCUMENTS

| | | |
|---|---|---|
| WO | WO 96/38801 | 12/1996 |

(Continued)

OTHER PUBLICATIONS

Gift Certificate.com (Aug. 1998).*

(Continued)

*Primary Examiner*—Vincent Millin
*Assistant Examiner*—Narayanswamy Subramanian
(74) *Attorney, Agent, or Firm*—Morgan & Finnegan LLP

(57) ABSTRACT

A method is disclosed involving acquiring a plurality of charge accounts. The accounts are of a type normally issued with an associated physically producible card which may be presented as evidence of an existing charge account, the physically producible cards bearing human readable account numbers and expiration dates. The plurality of charge accounts are capable of being gifted to a party, after acquisition. A request is received from a first party to gift a charge account to a second party having a name, without both the issuance and provision of a physical card for the charge account to the second party. The first party and the second party are different from each other. The charge account is usable in the name of the second party at any merchant who is capable of seeking authorization, using an authorization infrastructure, for purchases involving charge accounts for which the physically producible cards are issued, whether or not the physical cards evidencing the accounts are presented by purchasers when a purchase is made. An account parameter, selected by the first party, is accepted. The second party is informed of the account, by sending an e-mail to the second party. The e-mail contains a greeting selected by the first party and directs the second party to perform a specified action in order to cause an activation of the account. The account is activated for usage by the second party according to the account parameter. An indication that the second party has made a purchase from a merchant using the account is received and a settling transaction involving the account is undertaken after the usage by the second party. A system is also disclosed having a database with at least one table and a processor coupled to the database. The database is configured to, under control of the processor, maintain a record of a payment card account registered to a first person at the request of a second person, and for which, at no time at or before a time the second person buys from a merchant and provides payment by referencing the payment card account, no physical card for the payment card account will have been provided to the second person.

**43 Claims, 27 *INFORMAL* Drawing Sheets**

U.S. PATENT DOCUMENTS

| | | | |
|---|---|---|---|
| 5,442,567 A | | 8/1995 | Small |
| 5,453,601 A | | 9/1995 | Rosen |
| 5,469,497 A | * | 11/1995 | Pierce et al. ................ 379/115 |
| 5,477,038 A | | 12/1995 | Levine et al. |
| 5,513,117 A | | 4/1996 | Small |
| 5,557,518 A | | 9/1996 | Rosen |
| 5,636,346 A | * | 6/1997 | Saxe ............................ 705/1 |
| 5,642,419 A | | 6/1997 | Rosen |
| 5,663,547 A | | 9/1997 | Ziarno |
| 5,712,914 A | * | 1/1998 | Aucsmith et al. ............ 380/30 |
| 5,729,594 A | | 3/1998 | Klingman |
| 5,750,972 A | | 5/1998 | Botvin |
| 5,757,917 A | | 5/1998 | Rose et al. |
| 5,768,385 A | | 6/1998 | Simon |
| 5,796,841 A | | 8/1998 | Cordery et al. |
| 5,815,577 A | | 9/1998 | Clark |
| 5,815,657 A | | 9/1998 | Williams et al. |
| 5,864,830 A | | 1/1999 | Armetta et al. |
| 5,883,810 A | * | 3/1999 | Franklin et al. ............ 700/232 |
| 5,914,472 A | * | 6/1999 | Foladare et al. ............ 235/380 |
| 5,953,710 A | * | 9/1999 | Fleming ...................... 705/38 |
| 5,984,180 A | * | 11/1999 | Albrecht ..................... 235/380 |
| 5,991,380 A | * | 11/1999 | Bruno et al. ........... 379/114.15 |
| 6,044,360 A | * | 3/2000 | Picciallo ..................... 705/21 |
| 6,047,265 A | * | 4/2000 | Sugimori ..................... 705/26 |
| 6,175,823 B1 | * | 1/2001 | Van Dusen .................. 705/26 |

FOREIGN PATENT DOCUMENTS

| | | |
|---|---|---|
| WO | WO 96/41462 | 12/1996 |

OTHER PUBLICATIONS

"Electronic Payment System" O Mahoney D—Atech House 1997 (Text).*

Business Wire "Retailers Use Electronic Gift Certificates to Replace Paper Gift Certificates Programs" Aug. 26, 1998, Business Wire.*

Saul Hansell, (Nov. 4, 1998) "Got a Dime? Citibank and Chase End Test of Electronic Cash", The New York Times, Business day—C1.

"Gift Certificates" (5pages), www.catalogsite.com.

Card Express, Inc "The Future of Gifts and Incentives" (11 pages), www.cardex.com.

"NetFare" (4 pages), www.netfare.com.

CardTrak Online "Blockbuster Develops Electronic GiftCard For Video, Music Discovery Zone", Jan. 15, 1996 (2 pages), www.ramresearch.com.

American Express Incentive Services (5 pages), www.aeis.com.

Online Check Systems, "the Check's In The Net"(3 pages), www.onlinecheck.com.

George C.C. Chen "Electronic Commerce on The Internet: Legal Developments in Taiwan" (32 pages), Science and technology Law Center, http://stlc.iii.org.tw.

David Chaum, "Online Cash Checks" (5 pages), Centre for Mathematics and Computer Science http://ganges.cs.tcd.ie.

David Chaum, "Prepaid Smart Card Techniques: A Brief Introduction and Comparison", (4 pages) http://ganges.cs.tcd.ie.

Philip Holmes, Gift Certificates For Premiums/Incentives #3060 (10 pages), Sales marketing Network, www.infonow.com.

College Enterprises, Inc. "Special Teams" (2 pages), www.college-enterprises.com.

e-gold, "Questions and Answers" (11 pages), www.e-gold.com.

Electronic Cash (1 page), Sandia National Laboratories www.cs.sandia.gov.

"Investigate the Professional Issues Raised by Current Business Interest in Exploiting the Internet and the WWW for Electronic Commerce," (6 pages), www.csc.liv.ac.uk.

"Selected Presentations and Publications" (3 pages), www.ccs:neu.edu.

Peirce et al., "Scaleable, Secure Cash payment for WWW Resources with the PayMe Protocol Set"(15 pages), http://ganges.cs.tcd.ie.

Peirce et al., "Network Payment Mechanisms and Digital Cash: Electronic Payment Systems" (10 pages), http://ganges.cs.tcd.ie.

Networks and Telecommunications Research Group (4 pages), http://ntrg.cs.tcd.ie.

"A Quick Overview of E-Money, Plus Selected Links" (10 pages), Abracadabra, www.dabra.demon.co.uk.

Dr. Phillip M. Hallam-Baker, "Electronic Payment Schemes" (4 pages), www.w3.org.

BarclayCoin, "Questions and Answers, Wallet" (2 pages), www.barclaycoin.co.uk.

Andreas Crede, "Electronic Commerce and the Banking Industry: The Requirement and Opportunites for New Payment Systems Using the Internet" (19 pages), Science Policy Research Unit University of Sussex, www.ascusc.org.

Kalakota et al., "Readings in Electronic Commerce" (3 pages), http://ei.cs.vt.edu.

Lynch et al. "Digital Money" Chapter 2: Dramatis Personae (2 pages), www.oit.iusb.edu.

Verdonk, Otten, Dik & Wiegerinck "Gepubliceerde Artikelen, Internet Payment Systems: An overview" (10 pages), www.vodw.nl/kennis/artikelen/art47.htm.

Philip Holmes "Debit Cards #3040 New Form of Incentive Explained" (4 pages), Sales Marketing Network, www.infonow.com.

"Electronic Commerce of Component Information (ECCI) Program, White Paper" (5pages), www.sandia.gov.

"Electronic Commerce Subject Notes Second Semester, 1997" (17 pages), Department of Information Systems, The University of Melbourne, www.dis.unimelb.edu.

"Survey; Electronic Commerce Cash Poor" (3 pages), The Economist 1997.

"CyberCash and Barclays Bank Announces BarclayCoin Service" (2 pages), PRNewswire 1997.

"EFT's Final Frontier: Payments Over The Internet Bank Network News" (2 pages), Bank network News 1995.

"Unisource In Agreement with Belgium's Banksys on Electronic Payment Systems" (1 page) AFX-Europe 1997.

"Groups SET On Securing Internet Sales" Debit Card News 1998.

Rogier Van Bakel, "The Check is in the E-Mail -Digital Cash is Coming Faster Than You Think" (4 pages), NetGuide 1996.

Stefan Brands, "Electronic Cash on the Internet" (21 pages), Centrum voor Wiskunde en Informatica Kruislaan 413, NL-1098 SJ Amsterdam.

Kristol et al., "Anonymous Internet Mercantile Protocol" (16 pages), AT&T Bell Laboratories 1994.

Andre Furche and Graham Wrightson, "Computer Money: A Systematic Overview of Electronic Payment Systems" (pp. 25-33, 45-63), dpunkt—Verlag für Digitale-Technologie 1996.

Mahoney et al., "Electronic Payment Systems" (pp. 65-71, 146-182, 191-238), Artech House, Inc. 1997.

"Webcertificate(TM)—The Web's First Universally Accepted Gift Certificate, E-Mail to Anyone, Spend Online Anywhere", PR Newswire, Nov. 17, 1998.

"Pair of Web Companies Launch Gift Certificate Products for Holidays" Electronic Advertising & Marketplace Report, vol. 12, No. 22, Dec. 1, 1998.

Fitzpatrick, E., "Reel.com Aims to Ease Video Gift-Giving this Season", Billboard, Nov. 21, 1998.

* cited by examiner

TRANSFER INSTRUMENT

FIELD OF THE INVENTION

The invention relates to online commerce. More particularly the invention relates to an online commerce transfer instrument.

BACKGROUND OF THE INVENTION

Over history, payment for goods or services has taken many forms including: precious metals, cash, checks, credit, debit and charge cards. More recently, various forms of electronic currency or scrip contained in some form of electronic card or module or maintained in an electronic purse or wallet on a computer device have joined the fray, vying against more established and accepted payment methods for acceptance.

Precious metals and cash, because they are fungible, untraceable, and immediately usable by the bearer in possession, are readily acceptable forms of payment within national borders and across national borders if, in the case of cash, the cash is in a highly regarded or trusted stable national currency. However, to be used they must be physically exchanged. This creates problems of storage and loss. Furthermore, their untraceability makes them less suitable as gifts unless the giver and recipient are both present at the transfer or make use of some intermediary to transfer the gift, although doing so increases the chance of loss and may involve additional transaction costs for the delivery, insurance or verification of receipt.

Checks are most commonly employed for gift giving, because they are less fungible and provide traceability. However, a recipient of a check can not widely use the check as received, due to the increased exposure to loss posed by accepting a "third party" check. Furthermore, although checks may be written for any specific amount up to the amount available in the account backing the check, checks have very limited transferability and must be supplied from a physical inventory. Paper-based checking systems do not offer sufficient relief from the limitations of cash transactions, sharing many of the inconveniences of handling currency while adding the inherent delays and transaction costs associated with the processing of checks before and after use.

In the past few decades, payment cards in the form of credit, debit and charge cards have had great success in shifting the preferred method of payment in many segments of commerce, at the individual level, away from the use of cash and checks. However, obtaining a credit or charge card requires the person seeking the card to prove a level of credit worthiness, since payment for goods and/or services purchased today with the card will not be made until some time in the future. Alternatively, people lacking sufficient credit-worthiness, due to age, employment status or income level, could obtain a credit card if it was secured by a bank account and the usable credit line was linked to the amount in the account. Unfortunately, in many instances, it was difficult for people to put aside a sufficient amount of money in the bank account to make the secured credit card really useful. Furthermore, credit cards must physically be made sufficiently durable because they are not typically single use vehicles of commerce. Hence, the infrastructure associated with the creation, distribution and validation of receipt of the cards can impose significant costs.

Debit cards appear similar to credit cards from the use standpoint, however, like secured credit cards, debit cards require sufficient money to be available in an account or a transaction involving the card will not be approved.

Charge cards are like regular credit cards in that they are unsecured, however they differ in the payment requirements.

Predecessors and variants of credit, debit and charge cards are store or chain specific charge plates and travel and entertainment cards. However, in addition to having the drawbacks of more general use cards, the have the further disadvantage due to the limitations imposed by their specialized or local nature.

None of the aforementioned types of cards have been suitable gifts in the physical presentment context for a number of reasons. Since the line of credit, or funds balance in the backing account, of the owner was at stake, presenting a recipient with one of the above cards requires a high degree of trust in the recipient. Additionally, at some point, the card must be given back to the owner. Moreover, once given, the owner generally loses the use of the card while it is in the possession of the recipient. Of course, once given, the owner could also exert no control over its use beyond taking the additional step of canceling the card account and incurring the associated inconvenience of opening, or transferring to, a new account. Still further, by adding an additional level of separation between the owner and the card, if the card was lost, the time delay in noticing a loss of the card and informing the owner could be costly in time, inconvenience and/or finds. Also, to use the card, the possessor of the card must be dishonest and misrepresent him/herself as the cardholder. Last, and probably of greatest importance, due to merchant liability concerns regarding fraud, merchants accepting payment using one of those cards, for example by mail order/telephone order (MOTO), i.e. without physical presentation of the card, will generally not ship goods to any address other than the billing address for the card, further restricting use of the card by anyone other than the registered cardholder.

The internet, a series of thousands of computer networks around the world, has recently gained substantial popularity due to its promise of providing connectivity between so many computer users with functionality such as electronic mail, file transfer, and remote login. The customer base of internet users is expanding by the thousands and more businesses are discovering the marketing opportunities and advantages available on the "net." The World Wide Web, or Web, is an interface to the internet, which provides for easier access to information, goods and services.

In the business arena, a merchant can, with an internet address (also called a URL) and a hypertext editor, develop a hypertext document called a "home page" (or "virtual storefront") which can be presented (i.e. displayed) to a user sees when he connects to the merchant's Web server over the Web via the URL or a link or pointer thereto. That home page may provide descriptions of products and services through the use of media such as graphic images, sound, and hypertext link choices. The information allows the consumer to find the product or service he desires to purchase from his computer, as well as comparison or price shop. The result is an easily accessible system for purchasing anything from articles, pictures and advice to plumbing supplies, skis and tickets.

The rapid expansion of the internet, coupled with the absence of commonly accepted online payment schemes have caused many merchants with an internet presence to transact business over the internet as if it was a MOTO transaction. However, a reluctance on the part of payment card holders to send their payment card information over the internet has resulted in both lost sales and a concerted but widely varying attempt to enhance communications security or address the perceived lack thereof on the part of cardholders.

Thus, when the aforementioned risks regarding giving the use of one's debit/charge/credit card as a gift are coupled with the public perception regarding the security of data transmission over the internet, the giving of one's debit/charge/credit card as a gift becomes even less desirable in the internet context.

Recently, various forms of stored value cards have been proposed and implemented, most commonly containing or being a machine readable stripe or some form of electronic circuitry which can store "value" or some representation thereof on the stripe or in the circuitry. As presently understood however, in order to be used, the card must be physically present so that the stored information on the card can be read and altered as part of the transaction, either through contact with, or being in proper proximity to a compatible access device. Thus, if lost, most likely so is the associated stored value. Furthermore, their use is greatly restricted by compatibility and acceptability problems since any usage is limited by the value "on" the card and/or the expiration date (if any). Also, they must be physically transferred to be used. An example of such a card which is specifically designed for the gift context is known as e-Gift, offered by, or on behalf of, American Express®.

The e-Gift card however has a number of drawbacks. First, although it replaces a physical gift certificate, as a stored value card it must nonetheless be physically present to be used. It further has the associated creation, delivery and distribution costs.

Another example specifically usable as a gift is the MasterCard Gift Card from MasterCard International which operates like a debit card. The person who buys the gift card pays a sum of money which becomes the available value which may be used when the card is used. The MasterCard gift card thus has similar drawbacks present with any other debit card, including that it must be physically issued and provided and can not be activated until physically received by the recipient.

More recently, totally electronic cash transactions have gained desirability and are becoming somewhat popular. This is due to the ability to allow individuals to conduct purchase transactions on the internet. The advent of electronic cash transactions has aided an increase in the popularity of electronic shopping. Electronic shopping on the internet appears to be the wave of the future and may well overtake, if not replace, much of today's paper catalog shopping and perhaps ultimately forms of in-person shopping. However, it will likely take a long time for that wave to truly hit the shore. Many necessary or popular businesses have limited or no internet presence, and there is still a great reluctance among the general population in the United States to transact business over the internet using forms of electronic money not endorsed or backed by the U.S. government. Furthermore, the electronic data makeup of the various electronic money schemes are too incompatible with each other to be freely exchangeable with each other. Furthermore, due to their incompatibility, merchants' costs increase because they must add an acceptance infrastructure for each such "currency" they wish to accept over and above any existing infrastructure to which they belong and may incur transaction costs to "cash in" the electronic money or to "convert" to official U.S. currency.

Furthermore, in many cases, electronic money is transferred in denominations of fractions of a U.S. penny. Since those fractions are not recognized currencies of exchange large amounts may need to be accumulated before they can meaningfully and cost effectively be converted to U.S. dollars.

Among the better known electronic "money" related schemes are First Virtual, Collect All Relevant Information (CARI), CyberCash, Electronic Checks, NetBill, NetCheque, Ecash, DigiCash, NetCash, CyberCoin, Millicent, SubScript, PayWord, MicroMint, Mondex, and e-Gold.

Nonetheless, within the digital money community, for the most part, the chief concern that exists with financial transactions on the internet is security and privacy concerns resulting from the ease in intercepting, and the readable nature of, the electronic information being transferred. As messages move across the internet, they can, and often do, pass through many numbers of computers, any one of which can be utilized to intercept the messages for dishonest purposes. To address security concerns, current electronic commerce solutions generally employ encryption techniques and many require further techniques to prevent the possibility of reuse or double spending. In fact, almost all electronic cash transaction schemes depend on encryption for privacy and security enforcement. Furthermore, electronic money is more "unstable" in most instances than unstable national currencies, because unlike a country's currency, a "coiner" or "authenticator" of electronic money can disappear overnight with all its assets thereby rendering any outstanding "scrip" or "coinage" unusable by holders for any purpose. Thus, while sophisticated business may be willing to adopt the use of electronic money schemes among themselves, those problems, and the public perceptions thereof, are not conducive to forming a comfortable gift giving environment between individuals.

Finally, gift certificates and gift checks are widely used for gift giving. However, most are merchant (or merchant group) specific. Those that are available on the internet are generally usable solely on the internet or, to prevent widespread counterfeiting, require sanctioned printing and physical delivery to the recipient as well as physical presentation by the recipient to be used. Furthermore, redemption may place a special burden on merchants, due to the infrequency of receipt (and hence lack of knowledge of how to handle acceptance) or by imposition of redemption charges or special redemption procedures which must be followed by the merchant in order to be credited with the appropriate funds.

Thus, none of the above provide a cost favorable, overhead favorable, sufficiently convenient, widely acceptable way to give a gift which offer advantages for the purchaser, recipient and merchant.

SUMMARY OF THE INVENTION

We have realized that the issuance of physical cards, particularly in the gift context, causes problems in the prior art and that by using debit/credit/charge accounts but without issuing physical cards and providing them to the gift recipient we can create a transfer instrument which provides significant advantages over the prior art for the parties to transactions normally involving gift certificates. Of particular advantage, in general, is the ease of acceptance resulting from the similarity at every stage to different accepted and well understood norms of payment.

A few examples of the invention include a method in which a request is received from a first party, for a gift certificate for a named second party. The gift certificate is an indication of a charge account but without both an issuance and provision of a physical card for the charge account or provision of a presentable gift certificate to the second party. The charge account is usable solely in the name of the second party. It also has an associated first party selectable account parameter. It is also capable of having a purchase made using the account authorized using an authorization infrastructure of a card association. The second party is informed of the account and the account is activated for usage by the second party.

In another embodiment, the method involves issuing, to a recipient, an online certificate which is limited to a national card account of a plurality of national card accounts, without both issuing and providing a physical card for the national card account to the recipient of the online certificate. The online certificate contains all information necessary for the purchase of goods or services from any merchant who is capable of processing economic transactions involving one of the plurality national card accounts for which a physical card has issued, but without presentment of the physical card.

The invention also includes a system. The system has a database with at least one table and a processor coupled to the database. The database is configured to, under control of the processor, maintain a record of a payment card account registered to a first person at the request of a second person, and for which, at no time at, or before, a time the second person buys from a merchant and pays by referencing the payment card account, no physical card for the payment card account will have been provided to the second person.

As will become evident, the invention provides a broad advantage for the purchaser in that, depending upon the type of payment card used by the purchaser and the type of transfer instrument requested, one type of payment card account may, in effect, be converted into a different type of payment card account.

The invention further provides benefits and advantages for the purchaser in terms of convenience because a purchase of a transfer instrument may be made from anywhere in the world where internet access is available because the purchase is made online. The purchaser of a transfer instrument greater control over how the gift will be used. The transfer instrument may be thought of as a form of gift certificate where more widespread acceptability makes it more attractive than conventional gift certificates which either limit the recipient to a particular merchant or set of merchants, such as in the case of a store or online merchant gift certificate, or the requirement for physical presentation of the gift certificate in order to complete the purchase transaction.

The invention provides benefits for the issuer in terms of reduced cost for a number of reasons. First, because no physical certificate is produced or distributed the process can be fully automated. Next, the internet provides much wider advertising reach at a lower cost than print ads or the like. Furthermore, unlike with the issuer of conventional gift certificates or gift checks, the issuer operating in accordance with the invention does not need to establish any form of relationship with merchants who will accept payment from the recipient according to the invention.

Additionally the invention provides advantages for merchants because, although transfer instruments are purchased online, the gift recipient may use the gift to purchase from a merchant with no internet presence, a merchant conducting business solely over the internet, or merchants having some combination of an internet and non-internet presence. Furthermore, merchants do not need to follow special redemption procedures or need any additional infrastructure access to accept the transfer instrument if they can accept payment for similar types of accounts for which cards have issued and been physically provided to the cardholder.

Finally the invention has numerous benefits for the recipient of the gift. First, the recipient can not easily lose the gift, because nothing tangible is provided to the recipient which must be used or physically presented in order to make a purchase with the gift. Second, reservations on using the gift online will be reduced because it is a gift and thus not perceived in the same way as the recipients money, particularly with those persons most unfamiliar with online purchasing and hence those most reluctant to do so, because gift certificates are perceived differently than payment cards so purchasers using the gift will not perceive the purchase as being a form of payment card purchase. Thus they will be more willing to use the gift to make an online purchase, thereby increasing the number of potential online customers available to merchants. Third, the gift has wider acceptability than merchant specific gift certificates and need not be presented, such as in the case of gift checks. Last, embodiments of the invention allows the transfer of credit to the recipient irrespective of any factors normally considered in connection with the issuance of credit, for example, the recipient's creditworthiness or ability to pay.

BRIEF DESCRIPTION OF THE DRAWINGS

The novel features believed characteristic of the invention are set forth in the appended claims. The invention itself, however, as well as the various enumerated and unenumerated features, aspects and advantages thereof, will be best understood by reference to the detailed description of specific embodiments which follows, when read in conjunction with the accompanying drawings, in which:

FIG. 4 is a simplified database usable in accordance with an embodiment of the invention;

FIG. 5 is a more detailed database usable in accordance with a further embodiment of the invention;

DETAILED DESCRIPTION OF THE INVENTION

Figures 2, 6A:
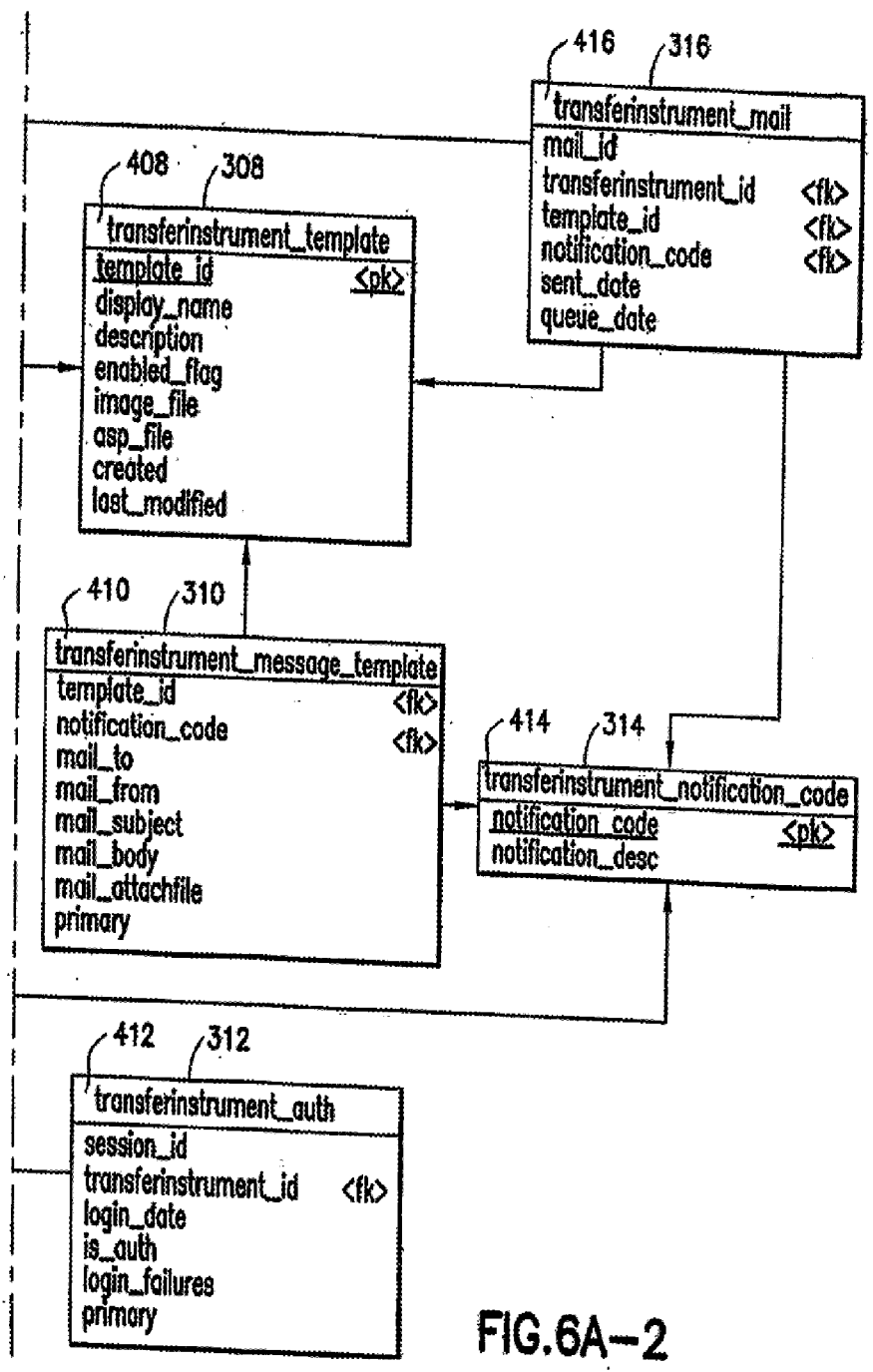
FIGS. 6A and 6B are ERD diagrams for a database usable in accordance with a further embodiment of the invention.
Figures 1, 6B:
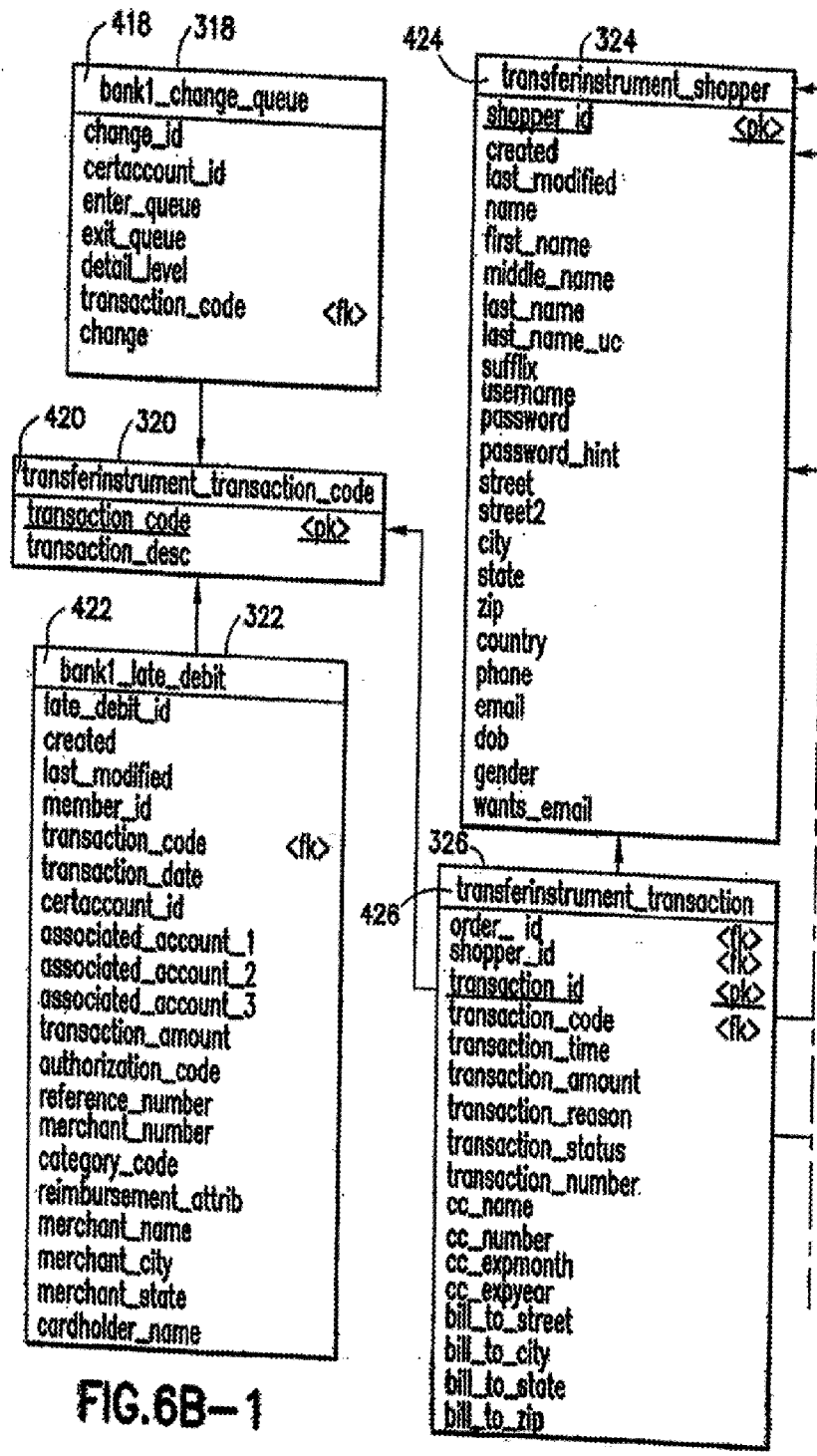
FIG. 1 is a high level overview of various entities and their relationships in accordance with the invention.
Figures 2, 6B:
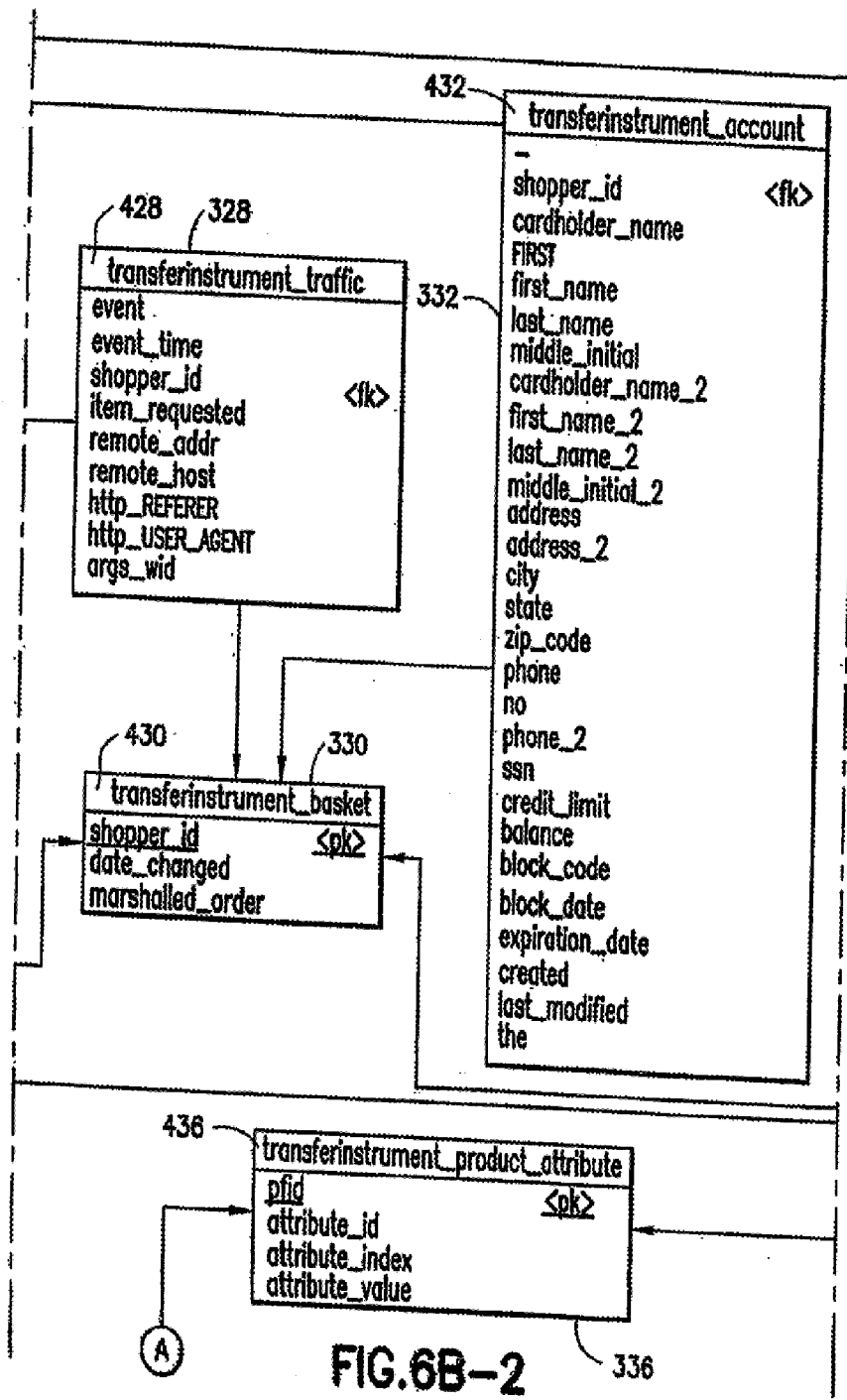

By way of summary illustration using FIG. 1 as one example embodiment, the invention may be realized through the following actions, the specific sequence of a number of the actions being unimportant to the invention:

Step 100: Transfer instrument issuer 10 is setup with the Issuing Bank 20, or a party acting on Issuing Bank's behalf, as an issuing client 10 with a related bank identification number (BIN).
  a) Issuing Bank 20 provides a file that contains available account numbers for distribution, but no physical cards will issue for the accounts and/or no physical card will be A provided to the recipient.
  b) Issuing Bank 20 sets up all of the account numbers on the host system 30 with the same name, address, Social Security Number (SSN), and an available balance or credit limit of zero.

Step 110: A purchaser purchases a transfer instrument (not shown) and has notification 50 sent to a recipient on or off line.

Step 120: The recipient 40 activates an account with the transfer instrument issuer 10 (preferably via the internet 42).

Step 130: Transfer instrument issuer 10 provides the recipient 40 with an account number and amount or limit that can be used at any merchant(s) accepting the same type of accounts where cards are issued. Transfer instrument issuer 10 activates the account on the issuing bank host system 30 by initiating a Host 232 to Host 30 transaction that will update the account name, address, and credit limit.

Step 140: Recipient makes a purchase at any merchant 60 (on line or mail order/telephone order) that accepts card type accounts where physical cards have issued and been provided to, for example, Visa, Mastercard, American Express, JCB, Eurocard etc. . . .

Step 150: Merchant 60 seeks, and Issuing Bank 20 provides, an authorized response to the merchant 60 via existing authorization infrastructure 70 such as, Visa, Mastercard and/or American Express connections.

Step 160: Issuing Bank 20 receives the transactions for posting via Base II/Inas if the account is a credit type account, and by Late Debit files if the account is a debit type account, and posts 90 the transaction to the account. The posting removes the pending authorization and reduces the amount or credit limit by the posted amount in the issuing bank's hose banking record system 30.

Step 170: Transfer instrument issuer funds a Demand Deposit account (DDA) with the Issuing Bank 20 for settlement purposes.

Step 180: Issuing Bank 20 settles with the transfer instrument issuer's DDA account on a nightly basis.

The following summarizes parameters desirable and advantageous for Issuing Bank 20 processing in accordance with the embodiment of the above steps:
  a) No physical payment cards are created or provided to the recipient for the accounts at, or before, the time the accounts are used by the recipient and/or a use of the transaction instrument by the recipient is settled with the transfer instrument issuer's DDA account;
  b) No monthly statements sent to the transaction issuer;
  c) Amount or credit limit is reduced during nightly processing;
  d) Account number generation and set up on the issuing bank master file is initially done with minimal information or with a dummy name, address SSN, and zero limit.
  e) When a purchaser purchases a transfer instrument, the transfer instrument issuer's Issuing Bank will receive an account maintenance transaction to change the account name and address to the recipient and charge the amount or credit limit to the parameter selected by the purchaser.
  f) Host to Host connection is made between transaction card issuer and Issuing Bank for updating the account when transfer instrument issuer activates the card for use.

It is desirable and advantageous that transfer instrument issuer 10++ not be required to pre-fund the DDA account for billing. Preferably they are notified of their required deposit. Issuing Bank 20 provides transfer instrument issuer 10 with their required deposit amount of a nightly basis. Transfer instrument issuer 10 then funds their Bank DDA account prior to Issuing Bank 20 processing.

To further aid in understanding the invention we have referred to certain terms herein in the following manner. "Physical card" and/or "physically producible card" as used herein means a tangible card of the type both issued, typically in a cardholder's name, and physically delivered in order to evidence the existence of a debit, credit or charge account and which is normally, although not necessarily, physically presented in connection with an economic transaction involving the account. Examples of such physical cards are debit cards, charge cards, credit cards or the like. Typically, those cards are related to national card accounts such as VISA, MasterCard, American Express, JCB, Eurocard, etc. Stored value type cards or stored value "modules" or "purses" contained solely in software for purposes of holding digital money are considered to be "physical cards" and physically producible herein unless they are predominantly acting as a debit, credit or charge card linked to a debit, credit or charge account in connection with the transaction in which case they are not "physical cards". In particular, stored value modules or purses are considered in this manner because, during a transaction, they require transfer of some form of additional digital certification along with the digital money, or require forwarding of all or part of the data representing the electronic money provided by the purchaser to a third party for authentication at the time of the transaction, which, in connection with the invention, is akin to a physical presentation of a card.

The term "transfer instrument" is used to refer generically to the result of the inventive transfer methods, which we expect will typically be used in the gift giving context. The transfer instrument is intangible in that it is not physically produced but, as will be described below for certain embodiments, may conveniently be represented in human understandable form. For example, in various embodiments, the gift of a transfer instrument may be evidenced by a display on a screen, an e-mail, a telephone call, a greeting card, or some other printed thing, alone or in combination with each other, with similar effectiveness in terms of how it can be used. In other words, according to one embodiment of the invention, the transfer instrument can be conveyed in fully usable form to the recipient entirely by voice, for example, solely by a phone call.

Figure 2:
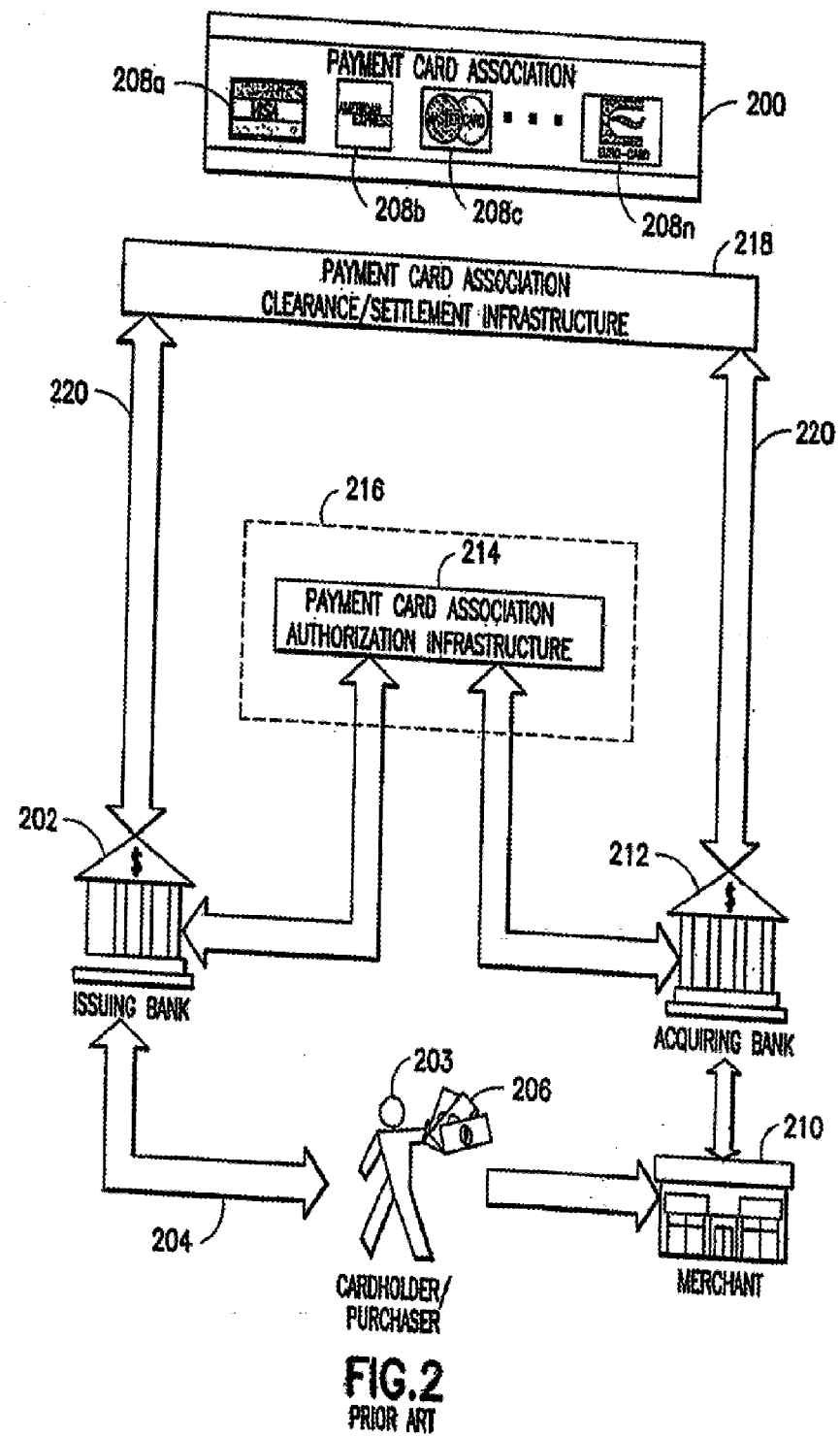
FIG. 2 is a high level diagram of prior art payment card entities and their relationships.

Referring now to FIG. 2, payment cards are most widely used in the retail situation for the purchase of goods or services. With most payment cards the card companies 200 themselves do not generally directly deal with the cardholders or merchants but rather licensed member organizations, usually banks, to do this for them. A bank that issues cards is called a card issuing bank 202. Typically they register the cardholder 203 by placing the account in the name of the cardholder, often accompanied by or following a check into creditworthiness, they also produce and provide 204 a physical card 206 incorporating the card association's logo 208a through 208n, or have it done on their behalf, and operate a card account to which the payments can be charged. Thus, for purposes of understanding the invention, issuance can be considered as made up of two main parts, a) the registration of the account in the name of the cardholder, and b) the creation and physical transfer 204 of a physical card 206 to the cardholder 203.

On the merchant's side of retail transactions, merchants 210 who wish to accept payments using the cards register with a bank 212 affiliated with the card association 200. Banks which register merchants are often referred to as acquiring banks 212 or acquirers. Of course, in many instances, the same bank may be both an issuing bank 202 and an acquiring bank 212. A notable exception to the foregoing are American Express® and Discover which operates in the roles of both the issuing and acquiring banks.

When a purchase transaction is made by the cardholder 203 typically the merchant 210 seeks authorization using a infrastructure 214 set up by the card association 200, or in the case of an arrangement like American Express® or Discover, one set up by the entity itself. It should be understood that, for clarity of description, the invention is described using the terms issuer, issuing bank, acquirer, acquiring bank, card association and authorization infrastructure, but they are also meant to refer to an entity where all those aspects are performed or provided by a single entity, like American Express® or Discover, or where some other combination or division of those roles exists.

Authorization typically involves an authorization center 216 which is operated either by or on behalf of the acquiring bank 212. In general the merchant 210 contacts the authorization center 216 which may in some instances contact the card issuing bank 202 to verify availability of finds or, if the transaction amount is small enough, merely verify that the card has not been blacklisted. Alternatively, the authorization center 216 may stand in for the issuing bank 20 and approve transactions without contacting the issuing bank 20. This is typically done for small transactions only. Clearing or settlement of the transaction occurs in a similar fashion as shown in FIG. 2. The acquiring bank 212 contacts a clearing or settlement system 218 also operated by, or on behalf of, the card association 200 which then contacts the card issuing bank 202. A funds transfer 220 is initiated from the card issuing bank 202 to the acquiring bank 212, at some point at or after the transaction occurs, and results in a debit to the cardholders account and a credit to the merchant's account.

Payment cards are typically classified into three types, on the basis of the time funds are due relative to the time of a transaction involving the card: i) pay before, ii). pay now, iii) pay later. The pay before cards are typically a form of stored value card which may either be specialized such as in the case of telephone or transit cards, or more generic cards typically known as "smart cards". Similarly, stored value modules or electronic "wallets" or "purses" can be considered pay before cards. Examples of such modules, wallets or purses are shown and described in U.S. Pat. Nos. 5,815,657, 5,642,419, 5,768,385, 5,373,558, 5,796,841, 5,815,577, 4,305,059.

With pay before cards, value must be transferred to the card, module, wallet or purse, before the card is used for a cardholder transaction and no separate "account", which will be accessed in connection with the transaction, is maintained or associated with the card which contains the value transferred, other than that physically "holding" the value on the card or in the module, wallet or purse. In other words, if the card is lost, or the module holding the value is damaged, the value is lost to the cardholder unless the card is recovered unused or the data in the module can be meaningfully recovered. Similarly, if the software implementing the wallet or purse is erased, damaged or corrupted the value will be lost unless the data can be meaningfully recovered.

With pay now cards, otherwise known as debit cards, the card is linked to a bank or other funded account so that at or about the time the transaction takes places the amount is automatically transferred from the customer account to the merchant's bank account in a debit transaction.

Pay later type cards refer to credit cards or charge cards. The difference between a credit card and a charge card is that with a credit card the outstanding balance need not be paid in full at the end of the billing cycle, whereas with a charge card an outstanding balance must be paid in full at the end of the cycle or else usage of the card is suspended until the balance is paid in full. As will become apparent from the discussion below, depending upon the embodiment, the invention utilizes various features and benefits of each to great advantage.

Since aspects of the invention involve commerce on the internet, a brief discussion of some of the more prevalent internet related payment schemes aids in understanding the invention.

CyberCash

Because the current banking credit card system is unable to directly handle internet traffic, CyberCash acts as a gatekeeper linking the internet to bank networks (currently Wells Fargo Bank and First of Omaha Merchant Processing) as needed. CyberCash provides security based on encryption in linking the internet to bank networks. Cybercash handles credit card, debit card and cash transactions and works with any web browser to download a free software module. Transactions are performed as follows.

The merchant first sends an electronic invoice to the buyer to which the buyer's credit card number is ultimately appended. Then, the invoice and the appended number thereto are encrypted and returned to the merchant. The merchant further appends his own confirmation number, encrypts this information again and sends it to CyberCash's server which reformats and encrypts per banking standards for transmission to the banking network. Debit transactions require the merchant to open a CyberCash account in advance thereby allowing the buyer to request funds to be transferred to that account in order to pay for the purchased merchandise. Where the merchant does not have a Cyber-Cash account, he must first download software from Cyber-Cash in order to be paid. Cash transactions use "pointers" to cash existing in "escrow" accounts and customer bank accounts. Payments occur when pointers enact electronic fund transactions between escrowed accounts.

DigiCash

DigiCash, works directly with the banks, resembling purchasing travelers checks. The user or buyer sends money to the bank through his/her credit or ATM card and the bank sends back Electronic cash to the user. Electronic Cash is an encrypted e-mail message containing numbers that correspond to a specific amount of money. These numbers can then be sent to the merchant as payment. The merchant forwards these numbers back to the bank who in turn credits the merchant's account. In this method, the bank keeps track of the numbers.

E-cash

E-cash is yet another that is used in conjunction with the Mark Twain Bank to allow "authentication" of digital cash withdrawals from bank accounts. A software program enables storing the withdrawn digital cash on the PC's hard disk. This stored "cash" can then be transferred to a seller's machine. In this scheme, participants must set up a World Currency Access account provided by the Mark Twain Bank.

First Virtual Holdings

Electronic transactions can be based on electronic mail (e-mail). The customer opens an account and is given an Identification (I.D.) number which is sent to the merchant via E-mail. The merchant then forwards the e-mail to First Virtual to verify the customer's I.D. number. First Virtual then sends an e-mail message to the customer to verify the transaction. First Virtual performs the most sensitive parts of the financial transaction off-line performing actual transfers over a private network using Electronic Data Systems (EDS) Corporation.

NetBill

NetBill is an alliance between Carnegie Mellon University and Visa designed to allow information (not hard goods) to be bought and sold through the internet. Customers deposit money into a NetBill account which is drawn upon by NetBill when purchases are made. In this system, a large server maintains accounts for both merchants and consumers. These NetBill accounts are linked with conventional financial institutions. When a consumer chooses to purchase goods or services from a merchant, a NetBill transaction is commenced in which the product or service is transferred, the consumer's account is debited, and the merchant's account is credited. When necessary, finds in the consumer's NetBill account can be replenished by electronic transfer from a bank or by credit card. Also, funds in the merchant's NetBill account are made available by depositing the finds in the merchant's bank account.

NetCheque and NetCash

This scheme was developed by the University of Southern California and allows registered users to write electronic checks to other users. Electronic checks may then be sent via e-mail as payment for merchandise purchased through the internet. Similar to paper checks, these checks authorize the transfer of funds from the accounts on which the check is drawn, to the account in which the check is deposited. NetCheque is based on the Massachusetts Institute of Technology Kerberos private key cryptography instead of the public key cryptography.

NetCheque and NetCash payments are both accepted by Pay-Per-View a worldwide web (WWW) protocol which allows "previews" of documents based on HTML and HTTP protocols. Upon "payment" (via an allowed scheme), the merchant's server receiving the payment then releases the full document to the customer's web browser.

Netscape Communication Corp.

This method appears to be one of the most common electronic cash transaction techniques used today. Netscape has formed an alliance with First Data, who is the number one processor of bank card transactions and has licensed public key encryption technology from RSA Data Securities, Inc., to develop an electronic credit card based scheme which only works with Netscape's web browser. Netscape sells a commerce server package that supports "secure" on-line purchase and data exchanges.

Some of the difficulties inherently existing in cash transactions over an open network, are evident in Netscape's "Secured Socket Layer" (SSL) (similar to WinSock Services). SSL sits between applications (such as FTP, HTTP, etc.) and the TCP/IP Transport layer and serves to provide secure identification and communications over a client/server link based on "digital certificate" technology provided by VeriSign (a spin-off of RSA Data Security). Digital certificates require a "third party guaranty" which must be obtained by users of SSL before transactions may occur. Consequently, a certificate of authority, such as a corporate security officer verifying the identity of a person is required.

VeriSign, currently the only provider of digital certificates, not only generates the certificate, but includes the user's name, their public key for encryption, and a digital signature attesting that VeriSign has performed the appropriate background check on the server owner or client's identity.

NTT

Nippon Telephone and Telegraph (NTT) has announced an online transaction system which allows users to transfer money or place credit from a bank account to that user's "credit card" based on a private key which is used in conjunction with a public key.

Open Market

"Open market" schemes allow a merchant following simple computer commands to open a "store" on its internet merchant server for a fee, in addition to monthly usage fees. Open market connects merchant servers to payment servers on which data is secured with personal I.D. numbers, passwords, data encryption, and a security code generated by a smart card (required for large transactions).

Visa/Master Card

Visa and Master Card are working together on Secured Electronic Transactions (SET) based on encryption technology from RSA and VeriSign. The Visa/Master Card SET scheme has attracted major players such as IBM, Microsoft, GTE, Netscape Communications, VeriSign and SAIC. SET is a multiparty protocol, securing communications among five parties in a payment card transaction where the card provider, the card holder, the card holder's financial institute, the merchant and the merchant's financial institution are parties involved in performing each transaction.

The following provide additional information regarding the schemes discussed above:

Checkfree http://www.checkfree.com
Cybercash http://www.cybercash.com
Digicash http://www.digicash.com
Ecash http://www.marktwain.com
First Virtual Holdings http://www.fv.com
MasterCard http://www.mastercard.com
NetBill Tel: (412) 268-2000
NetCheque/NetCash http://nii-server.isi.edu:80/info/NetCheque
Netscape Comm http://mosaic/unicom.com
Open Market, Inc. http://www.openmarket.com
VeriSign http://www.verisign.com
VISA http://www.visa.com Other electronic payment schemes, including those sometimes called micropayment schemes because they involve transaction amounts of less than a United States penny are described in O'Mahony, et al., "Electronic Payment Systems", Artech House, Inc. (1997), and U.S. Pat. Nos. 5,729, 594, 5,768,385, and 5,815,657, 4,960,981, 4,977,595, 4,305, 059, 5,642,419, 5,453,601 and 5,557,518.

An important and desirable aspect of the invention is that, the invention uses to great advantage, payment accounts of a type where physical cards: i) are normally issued, such as national and/or international issuers of payment accounts alike MasterCard, VISA, American Express, JCB, Eurocard, and also ii) are physically provided to the cardholder at or before the time the account is used for a purchase of goods or services. A further important aspect is that, despite the use of the payment accounts of this type, according to the invention, the account is preferably and desirably registered in a recipient's name (i.e. it is issued in the recipient's name)

but no physical card for the account is provided to the recipient. Thus, the invention runs counter to the normal practice with those types of payment card accounts in that, for that same type of account, a physical card is not both issued and provided to the recipient at or before the time the account is used by the recipient for a purchase.

System Structure

Figure 3:
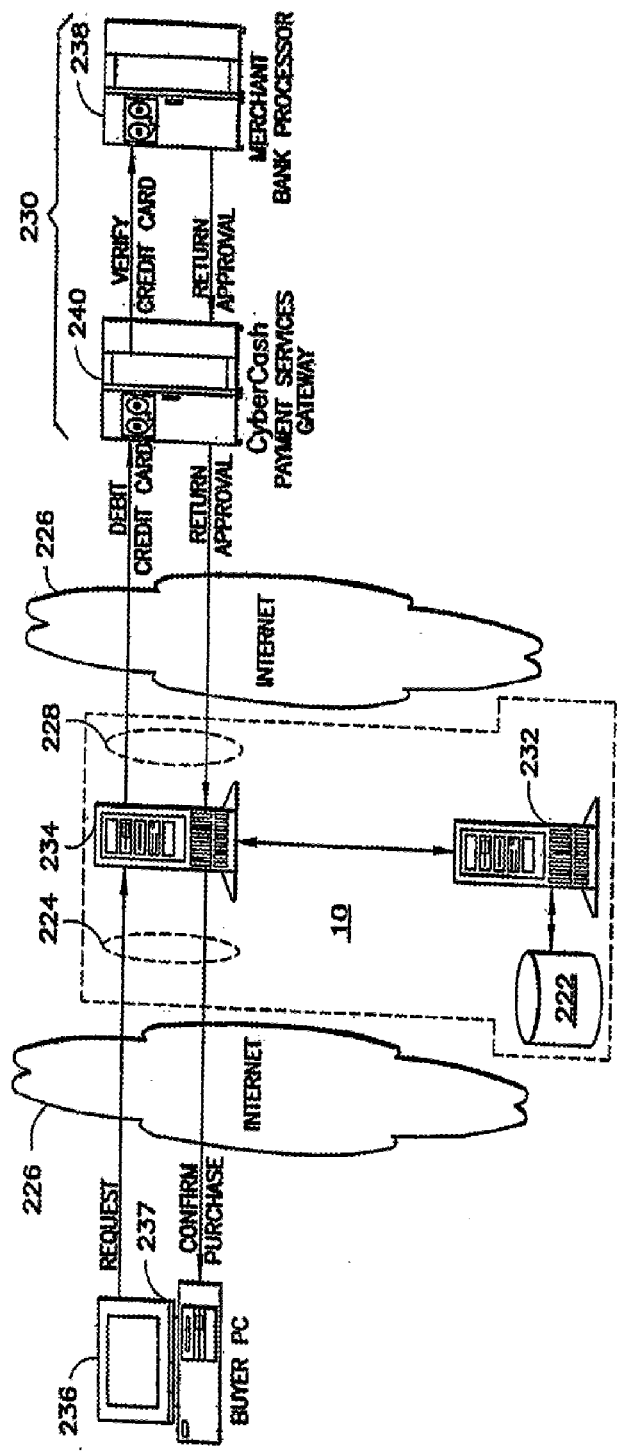
FIG. 3 is a high level overview of the entities involved in the purchase of a transfer instrument in accordance with the invention.

FIG. 3, shows an example arrangement for a system used in generating and processing a transfer instrument. The system consists of a database 222 an interface 224 to the internet or World Wide Web (interchangeable referred to herein as "the Web") 226 and an interface 228 to a banking system 230. Notably, the interface 224 to the Web may either be provided directly or through an entity which serves as a gateway to the internet and/or hosts web pages (commonly referred to as an internet service provider or ISP). Although not necessary, it is desirable and advantageous to have the database 222 and the interface 242 to the bank resident on one server 232 and both the interface 224 to the Web and the interface 228 to the banking system 230 resident on a different server 234, mostly for security and performance reasons.

Servers capable of being interface server 234 and/or the database server 232 are well known and both the hardware and associated software are constantly being changed improved, reduced in cost and/or complexity. Thus, given the rapid pace by which those changes and improvements occur, the specifically elaborated hardware and software will likely be obsolete in the near future. Furthermore, the specific hardware used as the servers 232, 234 and the associated software is not critical to understanding the invention. However, by way of example, one suitable interface server 234 is a server having an Intel 333 MHz Pentium II processor with 512 K cache, 128 MB of RAM, a 9.1 GB Ulktra-2/LVD SCSI7 hard drive, an Intel EtherExpress PRO 100/B PCI Ethernet adapter, and a 12/24 GB DAT tape backup unit. Additionally, example software which may be used in practicing the invention includes Windows NT Server 4.0 SP3 with NFTS, an option pack including IIS 4.0, SMTP Server, Index Server, NNTP Server and MTS, Site Server 3.0 Commerce Edition SP 1.

The database server 232 is similarly constructed to have an Intel 333 MHz Pentium II processor with 512 K cache, 256 MB of RAM, Dual Channel RAID with 16 MB cache. The server storage consists of three RAID-5 9.1 GB drives. Trio mirrored 9.1 GB drives for the operating system and database log files and one online spare 9.1 GB drive. The server 232 also has an Intel EtherExpress PRO 100/B PCI Ethernet adapter, 12/24 GB DAT tape backup unit and a 32× SCSI CD-ROM. Example software which may be used in practicing the invention includes Windows NT Server 4.0 SP3 with NFTS, an option pack including IIS 4.0, SMTP Server, Index Server, NNTP Server and MTS, and SQL Server 6.5 SP4 and updated Site Server 3.0 with Hotfixes.

Additionally, in some embodiments, the system may include an interface 242 to an issuing bank 20 from which accounts may be acquired, so that communications and account acquisitions can occur directly and in real time.

The database 222 is used to maintain the active transfer instruments as a list of accounts, which have been acquired from an issuing bank 20. Depending upon the embodiment, database record entries are created in the database 20 as part of the purchase process, as part of the redemption process, or alternatively they may be created before either process occurs. The interface server 234 communicates with the database server 232 as part of the transfer instrument process. The interface to the Web typically consists of a URL or Web address for a home page to which a prospective purchaser 236 may connect, due to the vast market available via the Web and interactive nature of the purchase process. The interface 224 may alternatively, or further, consist of an e-mail address. Of course, in one of the simplest embodiments, the interface 224 may consist of a telephone number which may be called by a prospective purchaser. The interface 228 to the banking system 230 is essentially a direct or indirect link from the "merchant"/offeror 10 of the transfer instrument to its acquiring bank 238. As noted above, numerous types of interfaces between merchants and banks for clearance and settlement of transactions are known to those in the art. Advantageously, the particular interface employed in any specific embodiment is a matter of choice, the specific selection being driven by factors not critical to understanding the invention, such as who the offeror of the transfer instrument uses as its acquiring bank, the methods of payment such as those discussed above (e-cash, Digicash, NetCheque, etc.) which will be accepted for purchase of a transfer instrument and/or whether authorization and/or clearance fees are charged. By way of example for one embodiment, the interface 228 of FIG. 3 is an indirect interface to the acquiring bank 238 using the CyberCash system 240 infrastructure. The interface 228 to the banking system 230 is used to authorize and clear payments made by a purchaser 236 of a transfer instrument.

Similarly, the interface 242 to the issuing bank 20 is a link to the bank from whom the offeror of the transfer instrument acquires the payment card accounts.

Additionally, an interface is provided for conducting the notification process to the recipient. The various interfaces used for notification will be discussed in detail below.

The various processes associated with the transfer instrument will now be discussed. Although, for clarity, the different processes are discussed in some sense sequentially from account creation through settlement/clearance after use, those of skill in the art will appreciate that while certain steps must necessarily precede others, for example, a specific transfer instrument cannot be used before it is purchased, many of the steps can proceed in a different order or even concurrently with other steps. Thus, unless a specific order is inherently necessarily required or is specifically referred to herein as necessary for operation of the invention, it will be recognized that no specific ordering is to be inferred from the description.

Account Creation Process

According to one embodiment of the invention, the offeror obtains payment card accounts from an issuing bank 20. The issuing bank 20 provides, for example, a series of account numbers corresponding to debit, credit and/or charge card accounts. The payment card accounts are initially issued in the name of the offeror and preset, in the case of debit cards, to zero value, or, in the case of credit or charge cards, a zero balance and credit limit.

Those accounts, and their associated information, are recorded in the database 222 and will serve as the pool from which transfer instruments are created.

In this embodiment, the database 222 is configured as a table 241 as shown in FIG. 4. The important aspect of the database 222 shown is that it correlates individual transfer instruments to individual accounts. There are a multitude of ways to construct a database meeting that criterion. By way of example, one way to organize the database 222 is using multiple records 242 with fields for the account number 244, limit or balance 245 and an expiration date 246. Additional fields may also be included as shown in FIG. 5. FIG. 5 shows an example database constructed with additional fields to handle a number of the various additional options making up additional embodiments. In this example, the database 222 has additional fields 248-262, which correlate to an indicator that the account is active 248, an account limit 250, a starting and/or remaining balance 252, a notification parameters or criteria 254, purchaser selectable parameters 256, a delivery date 258, the type of account 260, and activity and/or use parameters 262.

Depending upon the level of complexity desired, or to allow for expansion of available offerings by providing additional selection options to the purchaser or the recipient, the database 222 is preferably constructed with additional fields which may be used to implement those options without the need for creation of a whole new database.

A more commercially suitable example embodiment of the database 222 will be evident from reference to FIGS. 6A and 6B. FIGS. 6A and 6B are together an Entity Relationship Diagram (ERD) of a type used by those of skill in the art to assist in describing and constructing databases, in this case specifically to construct a database 222 in accordance with an embodiment of the invention. As shown, the database will be made up of a number of interrelated tables 300 through 338. At the top of each table is a name for each table 400 through 438. Underneath the name is a list of the fields which define each record. For example, Transferinstrument_Transferinstrument table 300 represents/defines a specific transfer instrument and is one of the core tables of the database. For a given transfer instrument this table 300 identifies: the buyer, the recipient, the denomination, messages to buyers or recipients, etc. Example fields include: guid is a multi-character unique identifier and pfid is a product_family table.

Transferinstrument_cancellation_code table 302 contains the list of all the possible reasons a transfer instrument can be cancelled. It is used as lookup table by the Transferinstrument_Transferinstrument table 300.

Transferinstrument_lock_code table 304 contains the list of all the possible reasons a transfer instrument can be locked. It is used as lookup table by the Transferinstrument_Transferinstrument table 300.

Transferinstrument_denomination table 306 contains the denominations displayed to the prospective purchaser when he/she is about to purchase a transfer instrument. It is used as lookup table by the Transferinstrument_Transferinstrument table 300.

Transferinstrument_template table 308 contains a list of all the different displayable templates a transfer instrument can have. It is used as lookup table by the Transferinstrument_Transferinstrument table 300.

Transferinstrument_message_template table 310 contains a template for each e- mail type or other notification media that will be sent by the transfer instrument system. There will be a different e-mail template for each transfer instrument template and for each type of e- mail or other media message that can be sent.

Transferinstrument_auth table 312 stores information relating to each login performed on a specified transfer instrument. This includes the date, whether the login was successful, and how many failed attempts took place before success.

Transferinstrument_notification_code table 314 contains a list of all the possible notification codes. For example, FIRST_NOTIFICATION_EMAIL, REMINDER_NOTIFICATION EMAIL etc. It is used as a lookup table by the Transferinstrument_mail 316 and the Transferinstrument_Tansferinstrument 300 tables.

Transferinstrument_mail table 316 contains a record for each notification (e-mail or other media) that was sent for a specific transfer instrument.

Bank1_change_queue table 318 contains all the records that are waiting to be sent to one of the issuing banks. Each record represents a request to have a new account activated.

Transferinstrument_transaction_code table 320 contains all the different types of transactions possible in the system. It is used as a lookup table by the bank1_late_debit 322 and the Transferinstrument_transaction table 326.

Bank1_late debit table 322 contains all the detail transactional data for each account. This data is retrieved by the system from the issuing bank and may be used to supply the user with online balance information.

Transferinstrument_shopper table 324 contains a list of all users in the transfer instrument system, whether they are buyers, recipients or both.

Transferinstrument_transaction table 326 contains an entry for every transaction that happens in the system. This can be a purchase, a transfer etc.

Transferinstrument_traffic table 328 is a security-related table that records the internet origination of a specific visitor to the site.

Transferinstrument_basket table 330 has an entry for each individual shopping basket that gets created by the transfer instrument store. It has a relationship to one or many records in the Transferinstrument_transaction table 326. It also has a corresponding record in the Transferinstrument_receipt table 334.

Transferinstrument_account table 332 contains an entry for each activated account at the issuing bank. Each Transferinstrument_shopper entry can only have one of these per transfer instrument payment card account type. If a shopper receives more than one transfer instrument of a type the separate values get combined into one account.

Transferinstrument_receipt table 334 stores a copy of each receipt that gets displayed at the end of the buying process.

Transferinstrument_product_attribute table 336 provides a link between each receipt line item and the corresponding transfer instrument sold.

Transferinstrument_receipt_item table 338 contains the line items for each receipt in the Transferinstrument_receipt table.

The tables 300 through 338 are interrelated as shown in FIGS. 6A and 6B.

Figure 7A:
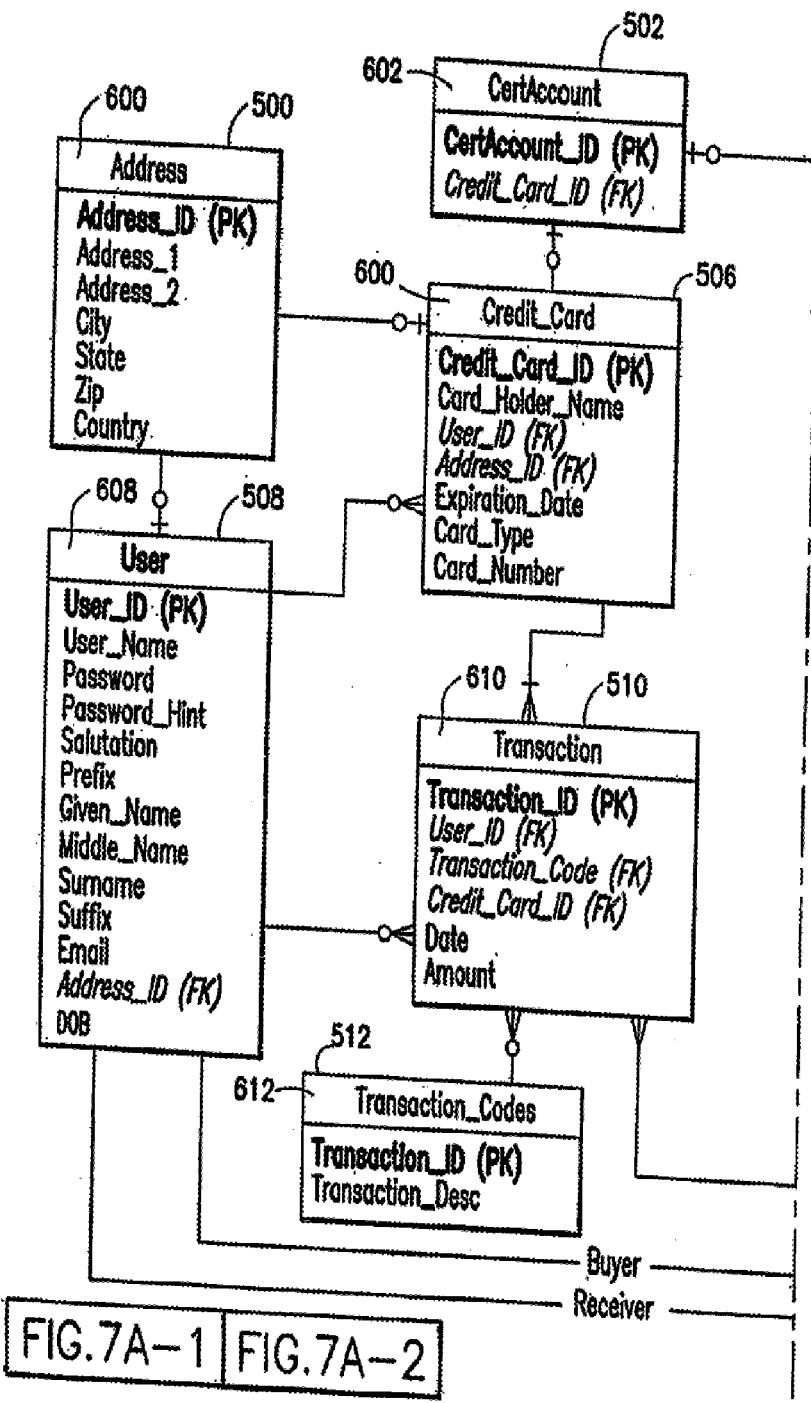
FIGS. 7A and 7B are ERD diagrams for a database usable in accordance with a further embodiment of the invention.
Figures 2, 7A:
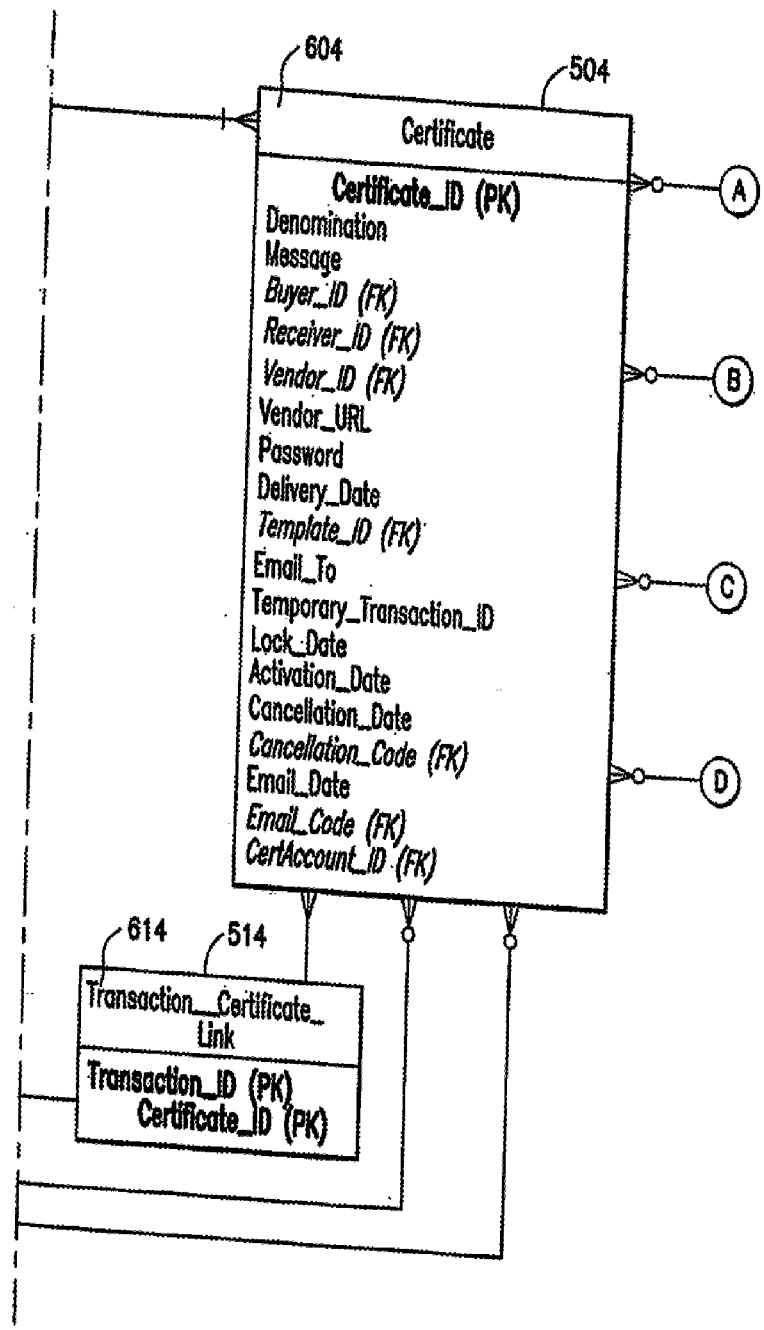
Figure 7B:
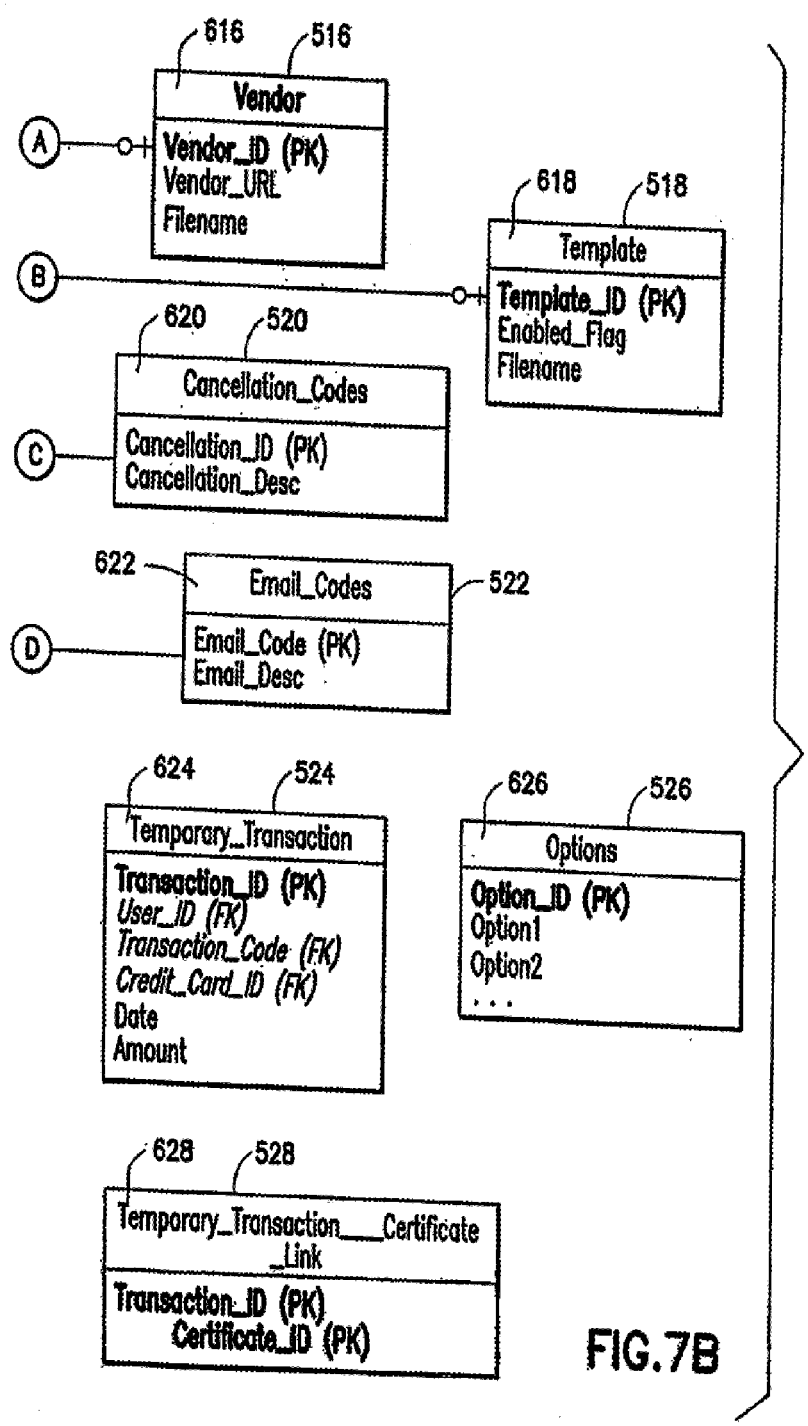
Figure 8:
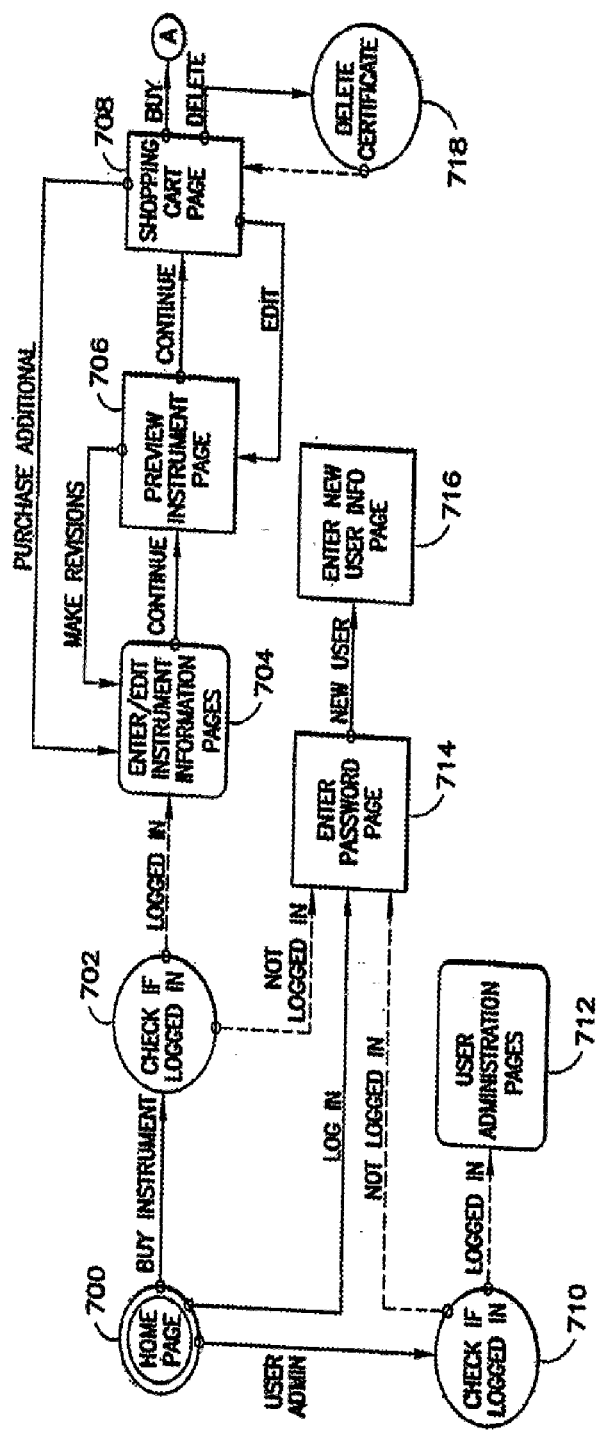
FIGS. 8, 9, 10, 11, 12 and 13 are UML diagrams of state transitions occurring in accordance with a further embodiment of the invention.
Figure 9:
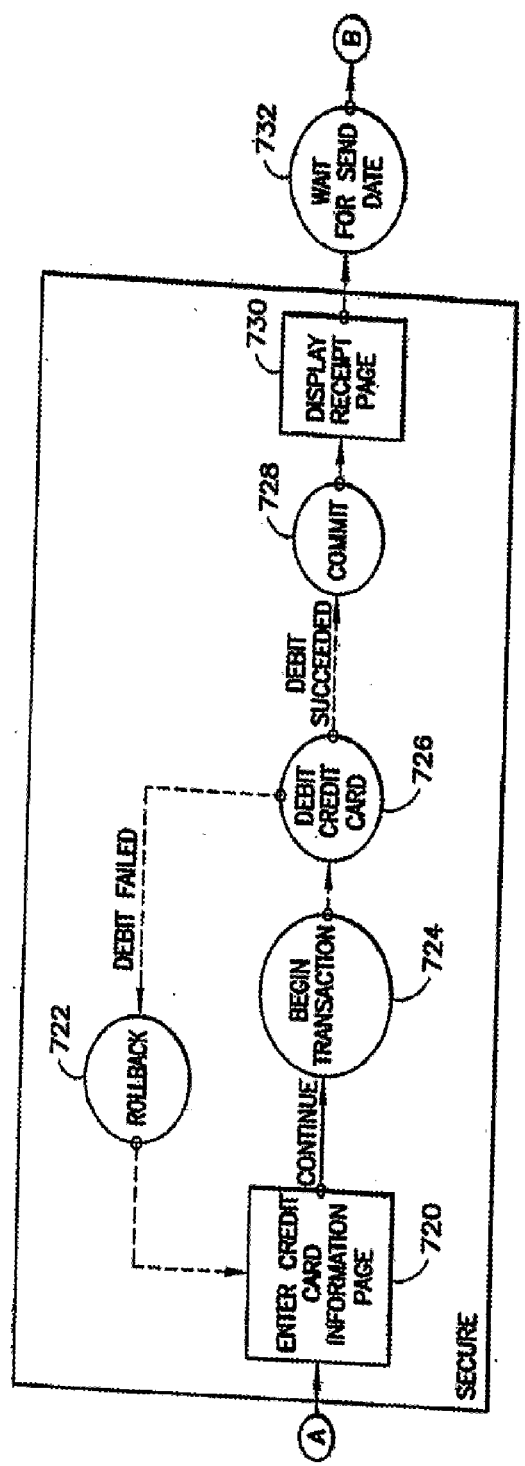
Figure 10:
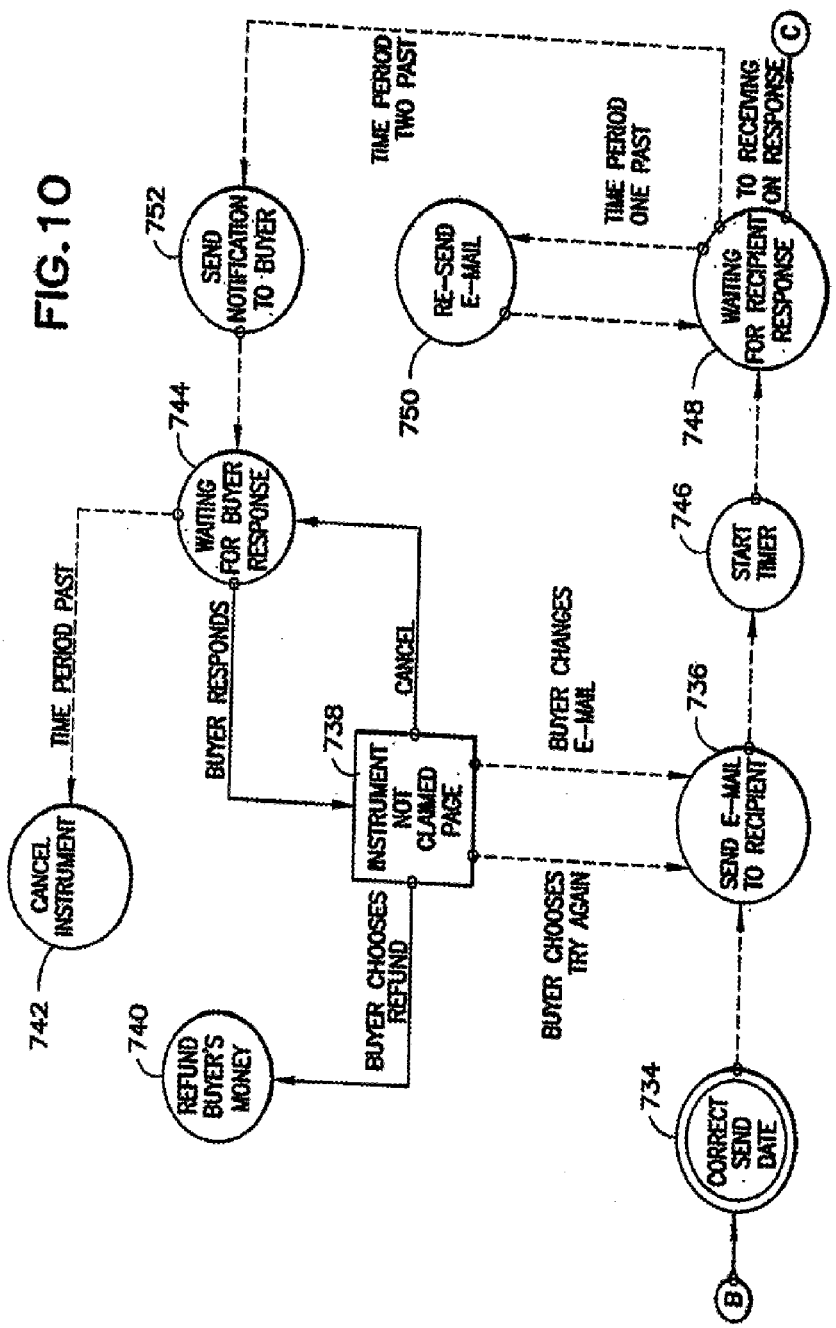
Figure 11:
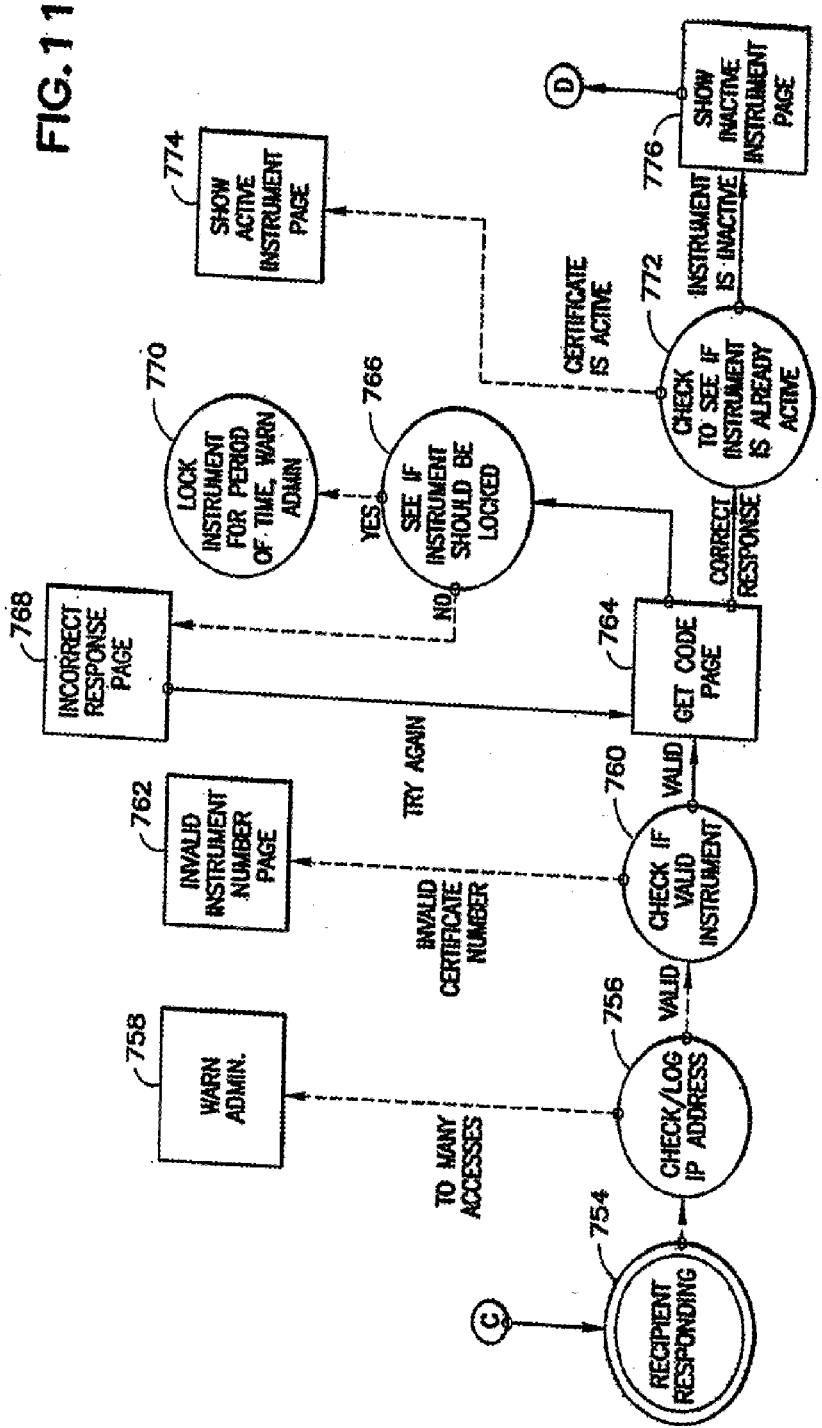
Figures 12, 13:
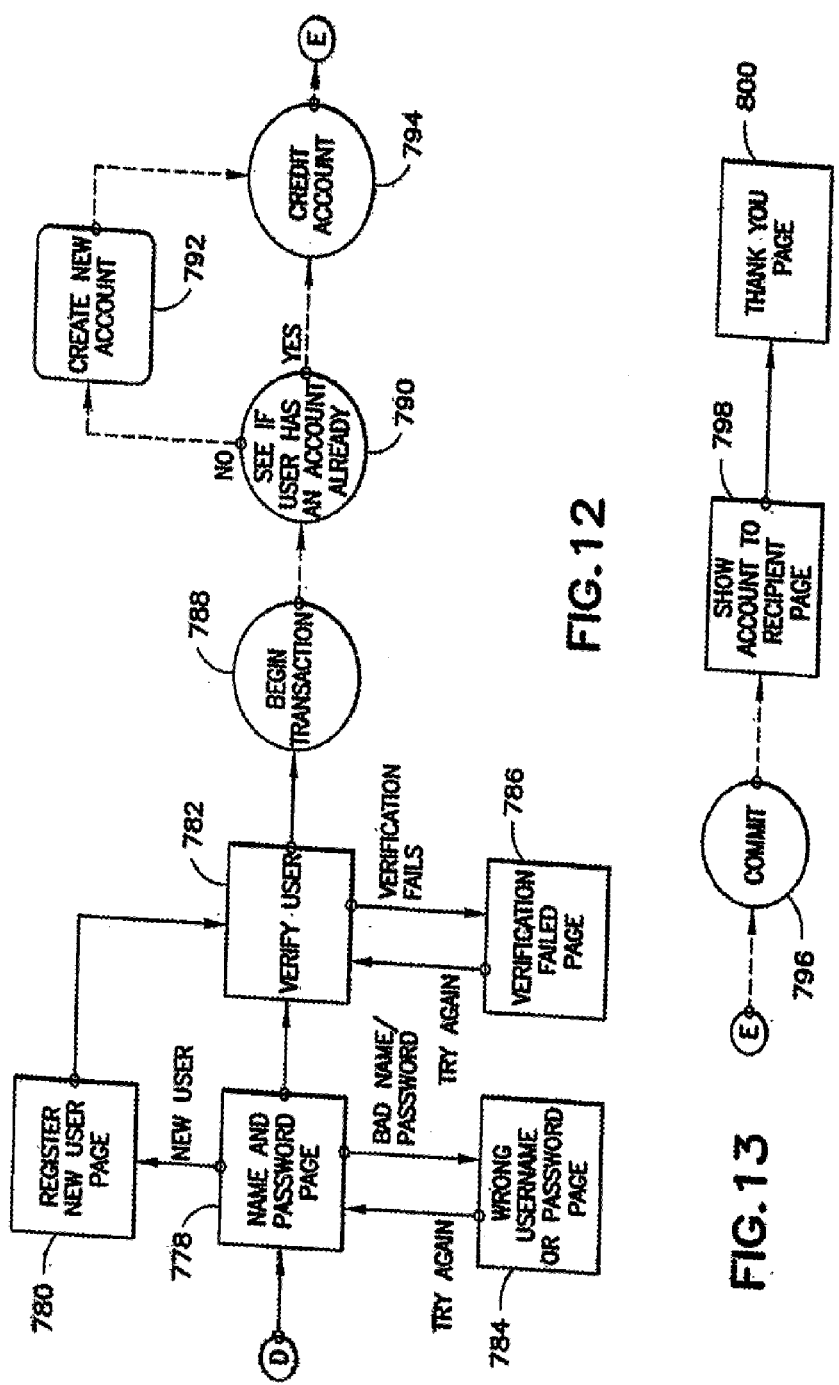
Figure 14:
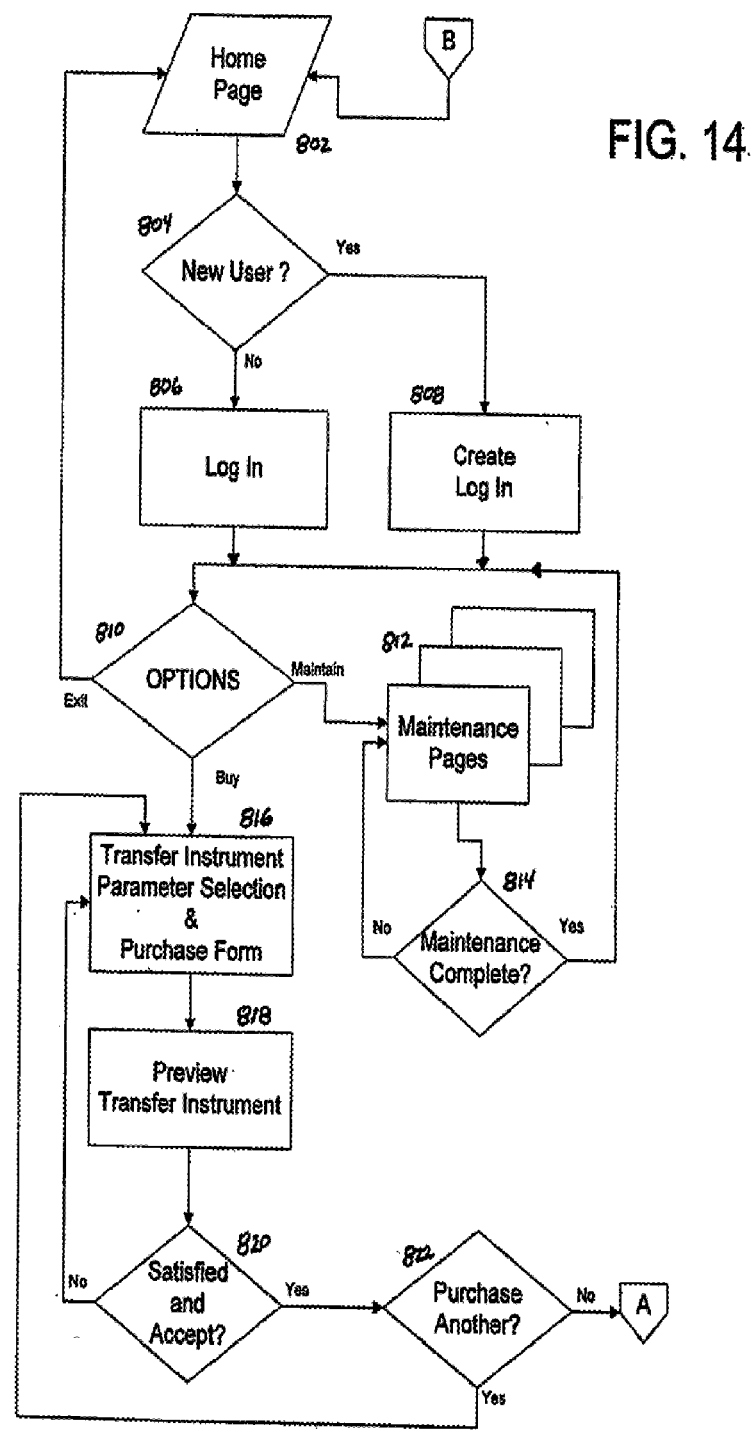
FIGS. 14, 15, 16, 17, 18 and 19 are flowcharts for steps involved in the purchase, notification and redemption of a transfer instrument in an example embodiment of the invention.
Figure 15:
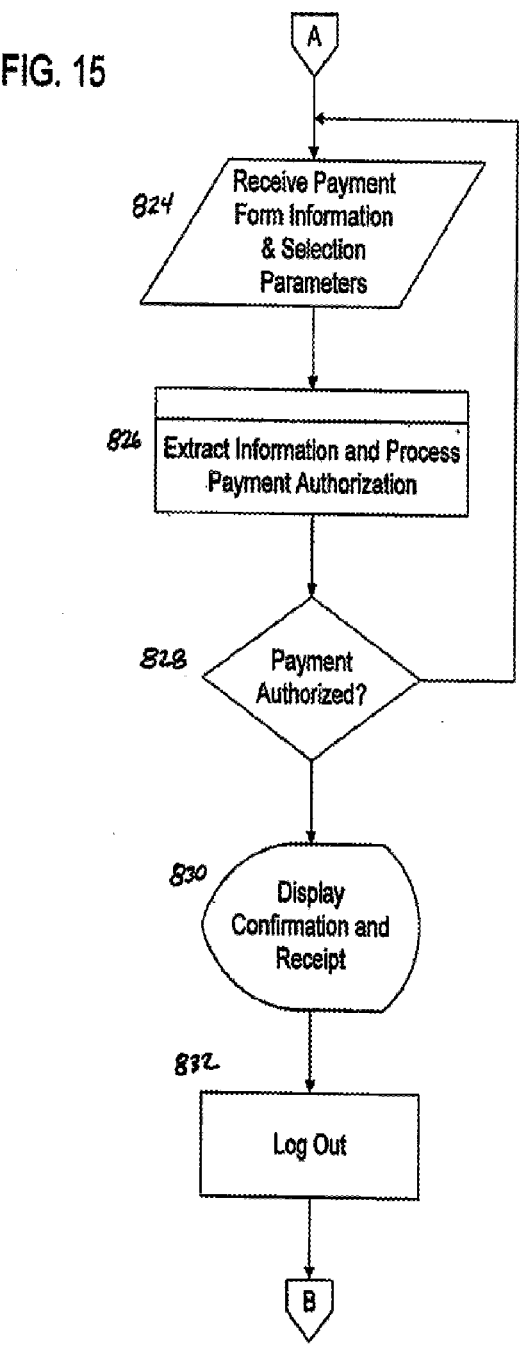
Figure 16:
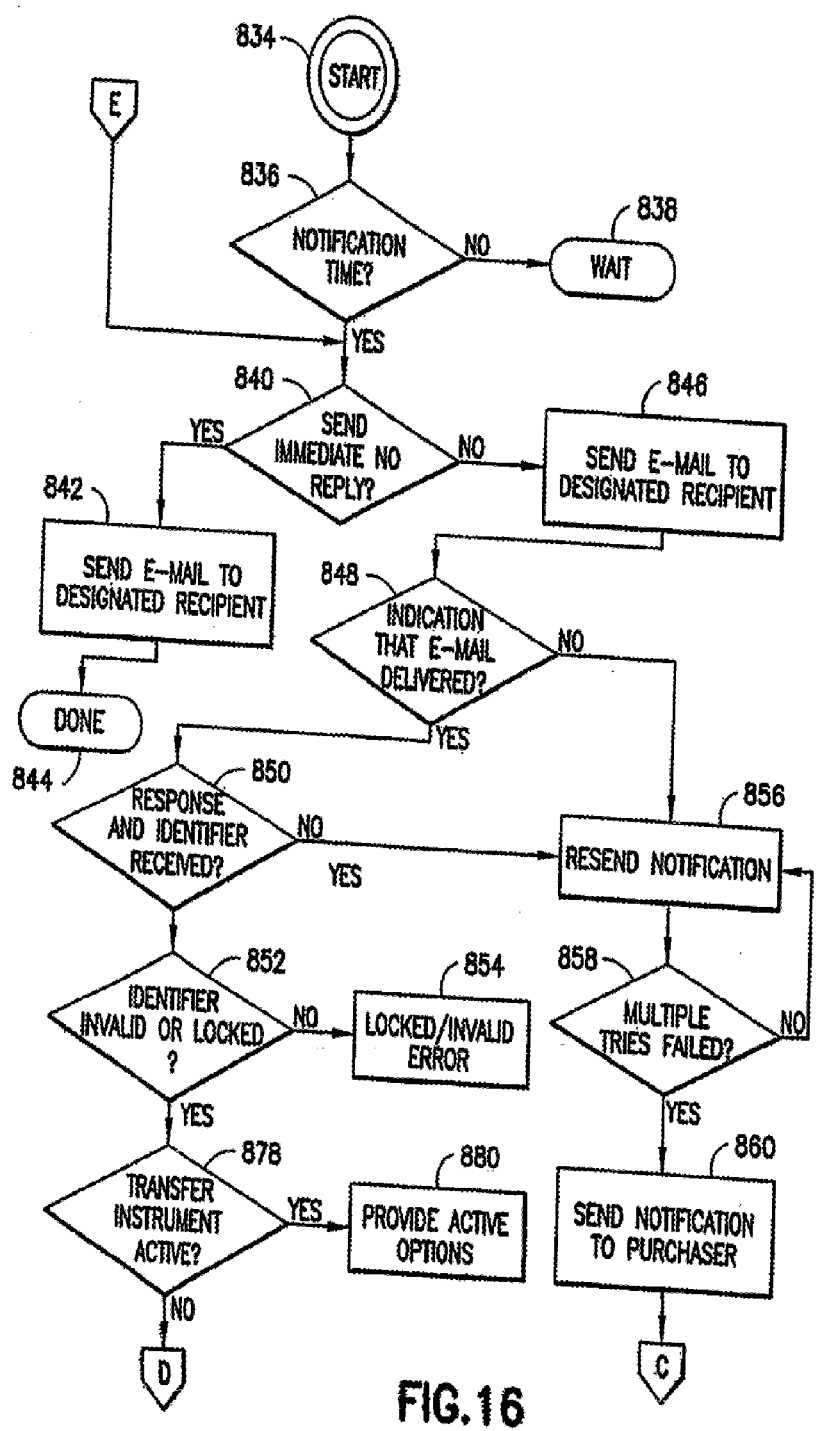
Figure 17:
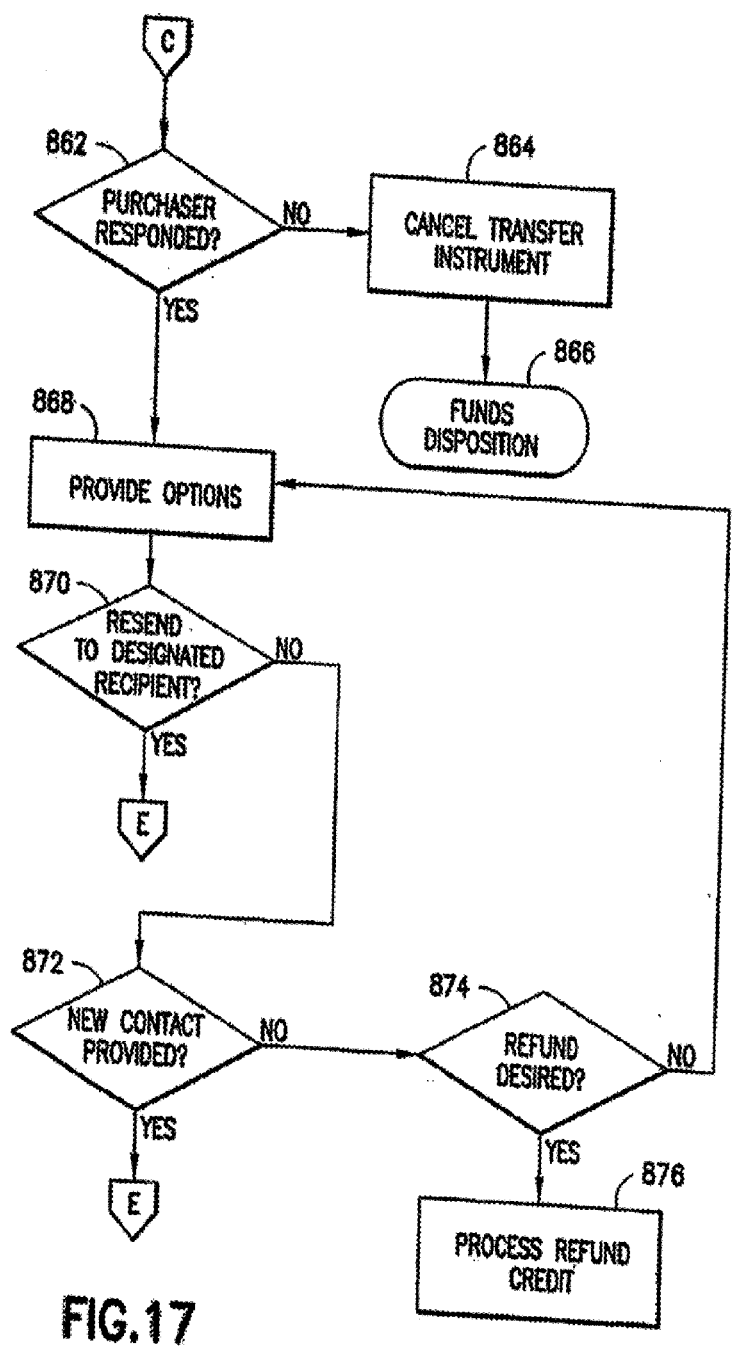
Figure 18:
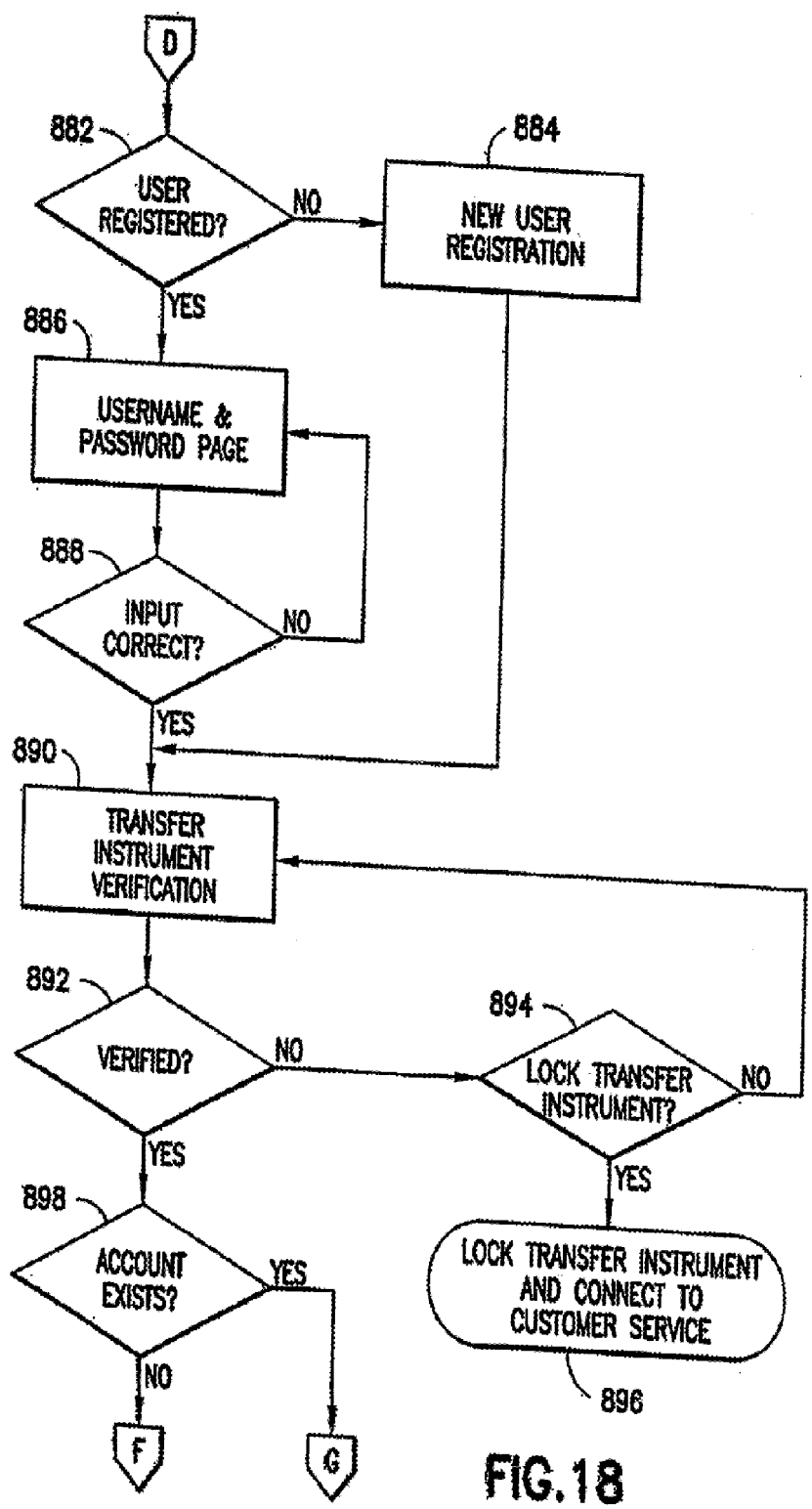
Figure 19:
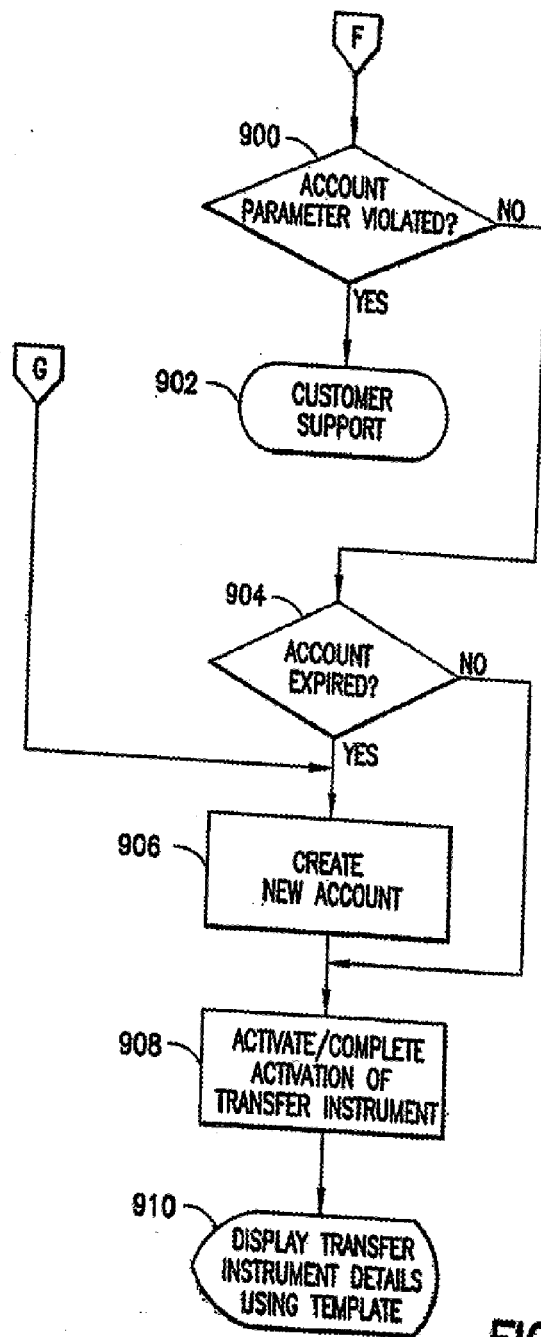

FIGS. 7A and 7B are an ERD for constructing another alternative example embodiment of the database 222. As with the ERD of FIGS. 6A and 6B, the ERD of FIGS. 7A and 7B contains a number of tables 500 through 528 with the fields which define each record being indicated in the respective tables underneath the table names 600 through 628.

By adding additional fields and records, particularly when the database is created in a table fashion such as in FIGS. 6A, 6B, 7A and 7B, a gift registry may be associated with either the purchaser's entry, the recipient's entry or both. The gift registry can take advantage of the notification process to notify either of the foregoing persons or some specified designee as a reminder of an important date or suggest a gift of a transfer instrument.

As an alternative to multiple accounts being transferred to the transfer certificate issuer in advance, accounts (and/or their account numbers) can be held by the bank 20 util a request is made for an account as part of the purchase process. At that time the offeror will request that the issuing bank 20 provide an account number for the type of account needed. In that case, for complete automatic notification embodiments, the placement of an entry for the account may itself indicate that the account is active. Otherwise, the account, although entered into the database, may still be marked inactive until other account activation parameters are satisfied. Advantageously, with this embodiment, there is no need to stockpile issued accounts.

Transfer Instrument Purchase Process

With continuing reference to the system of FIG. 3, the process of purchasing the transfer instrument proceeds as follows. A prospective purchaser 236 connects to the interface provided by the offeror 224, for example, using a personal computer 237 connected to the internet 226, by entering on a web browser program a URL for the site, the Internet Protocol (IP) address or by following a hyperlink. The prospective purchaser 236 sees displayed on the screen descriptive information relating to the transfer instrument. For example, the descriptive information may include material extolling the benefits of the transfer instrument, describing what a purchase entails, describing the notification process and/or any fees which may be incurred by the purchaser. Once the prospective purchaser 236 decides to purchase the transfer instrument, they indicate this intention by clicking on a link which will change the display to a purchase form. Although not necessary for the invention, for security reasons, it is desirable at this point to establish a secure communication connection between the browser running on the purchaser's computer 237 and the offeror 10, using one of the many secure protocols available.

The form allows the purchaser 236 to provide a formal request to the offeror 10 by providing such information as the purchaser's name, address and payment information (i.e. the payment being used to back the account). The form is designed, for example, to accept any of three different forms of payment: debit/credit/charge card; electronic money (e-money); or direct payment from a bank checking account. Of course, other forms of payment such as those referenced above may be accepted as well as, or in lieu of any or all of those three. The purchaser 236 also provides the name of the intended recipient, the denomination or amount for the transfer instrument and, depending upon the embodiment, the type of transfer instrument desired. The purchaser 236 also provides the recipient's e-mail address, telephone number, and/or mailing address for use in the notification process. In alternative embodiments, the purchaser may also be allowed to specify a greeting and or personalized message which will be used as part of the notification process. The greeting may be free form or part of a template. It may be as simple as a "To:" and "From:" or as complex as an elaborate graphical or multimedia display, depending upon the particular notification methods made available by the offeror 10 and/or the capabilities of the intended recipient for receiving a particular form of greeting.

Advantageously, the denomination or amount may be any amount specified by the purchaser 236 although, in some embodiments, for administrative reasons, it may be desirable to require a minimum amount, a maximum limit, or suggest specific predetermined or standard amounts. Thus, in the case of a credit or charge type transfer instrument, it may be desirable to require a minimum transfer of a one hundred ($100) dollar credit limit. In the case of a debit type transfer instrument, it may be desirable to require a minimum value of twenty-five ($25) dollars and/or provide standard value increments of five ($5), ten ($10) or twenty-five ($25) dollars. The purchaser may also be allowed to specify other parameters such as delivery date, starting date, expiration date, duration or "life" of the transfer instrument given, or a billing address in the case of a credit transfer.

Furthermore, the offeror may allow for certain purchaser selectable account parameters or criteria in the database but, for various reasons, not make them available to the purchaser as selection options. In that case it is desirable to use defaults for those parameters or criteria. In this manner, those parameters or criteria may be considered from the offeror's perspective as having been a selection made by the purchaser.

In addition to the amount, a prospective purchaser will likely be assessed a fee. Depending upon the embodiment, different fee arrangements may be used and, being well known and unnecessary for understanding the invention, are not discussed herein.

As a further advantage, to protect against loss by the recipient, the purchaser may also be requested to include a password which will be associated with the transfer instrument database entry. Thus, in the event the recipient contacts the offeror seeking "replacement" of the transfer instrument information, the purchaser 236 can be contacted and authorize reissue. Alternatively, the password can be one known or conveyed to the recipient as a means of verifying that they are who they purport to be, either to activate/redeem the transfer instrument or to allow them to recover the transfer instrument if they "lose" the information necessary to use it.

Through the use of a database, the purchaser 236 may additionally be allowed to specify post-purchase criteria. For example, the purchaser 236 may be allowed to specify that, upon use of the transfer instrument, the purchaser 236 will be informed that the use has occurred, the date of the use, and/or some identification of the merchant with whom the instrument was used. When one of those criteria are selected, the appropriate field(s) of the database 222 will be updated to reflect the selection. Thus, upon a use of the transfer instrument, when the database is accessed, the offeror 10 will have an indication that an action must be taken consistent with the database entry and can do so. Alternatively, the purchaser 236 may be allowed to specify the action to be taken if the transfer instrument goes unused, expires with a remaining balance, or notification of the designated recipient cannot be made.

In still other embodiments, the purchaser 236 may have the further option of recommending a particular merchant or selecting a recommendation from a list of merchants provided by the offeror, the merchant list being maintained as part of the database. If such an option is available, the recommendation can be conveyed to the recipient, for example, during the notification process, however, the recipient need not use the transfer instrument with the merchant(s) recommended.

Once the purchase form is complete, the purchaser 236 clicks on an icon which sends the form contents to the offeror. The purchaser supplied information is extracted from the form.

In the embodiment of FIG. 3, where the CyberCash system 240 is used for authorization/clearance of the payment, if the purchaser 236 has paid using a debit/credit/ charge card, for example, a MasterCard, VISA or American Express, authorization will be obtained in the conventional manner through the CyberCash system 240. Where the offeror 10 is connected to the MasterCard or Visa card association 200, that authorization infrastructure 216 may be used. Similarly, if alternative payments schemes are acceptable, the authorization/clearance infrastructure associated with those schemes will accordingly be used.

An account number entry for a payment card account obtained from the issuing bank 20 is added and/or assigned in the database 222 and fields are populated in accordance with the information received.

Additionally, the account is registered in the name of the designated recipient and, depending upon various account parameters, such as delivery date, start date, notification method, duration or expiration date, the notification process may be immediately invoked or queued up for later invocation.

If the purchase form also provided greeting options or templates for precreated greetings or creation of custom text, audio, video or multimedia greetings, the server software segregates that information for construction of the appropriate greeting or insertion into the template at the appropriate time, typically during the notification process.

Upon authorization, the purchaser 236 may be provided with additional options, such as display of a printable receipt and/or a tracking number and may further be provided the option to see/hear/preview the greeting or fully filled template as it will be presented to the recipient.

The purchase process may further provide for verification of the selections, either by requiring entry twice or by displaying the entered information and prompting for confirmation that the information is correct. Although not required, at a minimum it is preferable to confirm that any parameter to be used by the notification process is correct, such as by verifying the e- mail address, postal address and/or telephone number.

Notification Process

The notification process is invoked following payment by the purchaser 236. The notification process entails the notification of the recipient regarding the transfer instrument.

In certain embodiments, notification is completely accomplished in a single action by sending an e-mail, telephone call or postal type delivery. In those embodiments, the notification will inform the recipient of the transfer instrument of everything necessary for use of the transfer instrument including conveying the account number, its expiration and specific use instructions along with any greeting selected by the purchaser 236. Additionally, in further embodiments, the recipient may merely be informed of the existence of the transfer instrument and directed to call a particular number, e-mail a particular address, or go to a specific URL or IP address in order to obtain the account number. Advantageously, the URL in the e-mail notice may contain a unique identifier which can be used to locate the appropriate transaction instrument or bring the recipient directly to a page where a greeting can be viewed. Depending upon the specific implementation, the unique identifier may be visible to the recipient as part of the URL address, or may be hidden as part of an embedded hypertext link in the e-mail. In still further embodiments, and in keeping with aspects noted above, it may be desirable to tell the recipient that they will be required to provide a password in order to obtain the transfer instrument information. If the notification is of the type which requires the recipient to take 5 some action (e.g. call, e-mail or go to a website), the recipient may also be informed of a date by which they must take the action or of certain parameters specified by the purchaser 236, such as a duration or expiration date which would render the transfer instrument invalid if the action was not taken accordingly.

Alternatively, notification may be performed partly offline, for example, using the postal mail, and partly online, for example, using e-mail and/or a website, to complete the notification process.

In a similar manner to that used for greetings, the notification process may also be used to allow the recipient to send a form of "Thank You" notification to the purchaser 236, either automatically or using one of the pre-created or custom created "Thank You" templates or messages which may be available. The notification process also handles contingencies, for example, if the notification of the recipient cannot be accomplished perhaps after multiple tries of the same method (e.g. e-mail) or by sequencing through alternate methods (e.g. first e-mail, then phone, then postal mail). If notification cannot be accomplished, the notification process notifies the purchaser 236 of that fact. The notification to the purchaser 236 may also provide direction to the purchaser 236 as to how to proceed. For example, the notification may direct the purchaser 236 back to the purchase interface and, by indicating or selecting the tracking number, allow the purchaser 236 to specify a new recipient. Alternatively, the purchaser 236 may be provided the option of receiving a refund of monies charged or, in the case of a transfer instrument with a charge limit which results in subsequent billing of the purchaser's credit card for the amount of the purchase, automatic cancellation of the transfer instrument.

As will be discussed below, since an additional feature of the transfer instrument is the ability to make the purchaser 236 anonymous to the recipient, if the recipient of an anonymously purchased transfer instrument cannot be successfully notified, the notification process is designed to either handle disposition of that account, for example, in accordance with local laws or appropriate business practice, or invoke a separate process to do so.

Activation Process

The activation process readies the account for use. Depending upon the particular embodiment, activation may occur at or near the time of purchase, on some future designated date, or following some action on the part of the recipient. In general, activation will be accomplished by, for example, setting an active indication in the database for the account record and notifying the issuing bank of the name of the recipient who is to be registered on the account. The important aspect of activation is that all the appropriate information is conveyed, in accordance with the issuing bank's requirements, so that the payment card account may be accessed when the transfer instrument is used. In embodiments where e-mail is used for notification and all information necessary to make use of the transfer instrument is completely conveyed to the recipient in that e-mail, activation may occur upon sending of the e-mail. Since many e-mail programs now have the capability to indicate to a sender that an e-mail has been delivered or in some cases, that the e-mail has been read, in other embodiments, activation may be triggered by receipt of an indication that the e-mail has been delivered and/or read.

If it is desired to make the purchaser 236 anonymous, the greeting or notice can indicate that fact and, upon activation, information about the purchaser 236 can be automatically purged from the database 222 of the system. Alternatively, the purchaser information can be purged as soon as the purchaser's payment is authorized.

Redemption Process

In some embodiments, it is desirable and advantageous to require that the recipient take some action before activation can occur. Where action is required on the part of the recipient either before the transfer instrument can be used or in order to provide the recipient with some information which is necessary for use, such as the account number, an expiration date, a valid period, or a password collected for authentication purposes, a redemption process is invoked. For example, the notification may be an e-mail which tells the recipient they have received a gift of $100 which must be used within one month of their response date, provides them with a locator number which will be used to locate the appropriate account, and directs them to a website. Thus, since a response from the recipient is required, the redemption process will be invoked. When the recipient goes to the indicated website and either manually provides a locator number or has linked to the website URL using the hypertext link containing the locator, the activation process can be invoked. Alternatively, the recipient may further be required to provide additional information, such as the password specified by the purchaser 236 or their own password which can be used at a later time by the recipient in order to obtain account information such as the remaining balance or credit, or time until expiration.

In additional embodiments, the recipient may be given an option to "override" a post-purchase criteria specified by the purchaser 236. For example, the purchaser 236 may have been allowed to request notification of when the transfer instrument was used and an identifier for the merchant with whom it was used. The recipient may, for privacy reasons, not wish to allow the purchaser to know when, where, or even if the transfer instrument was used. Thus, the recipient may be given the option to, in effect, deselect parameters specified by the purchaser 236. Alternatively, the purchaser may only be given a partial override, allowing them only to prevent the purchaser from being informed of when and where the transfer instrument was used, but not override notification that the transfer instrument was, in fact, used.

Merchant Acceptance/Authorization

The transfer instrument is, behind the scenes, a payment card account which has been registered in the name of the recipient. However, no physical card has been issued and provided to the recipient. Nevertheless, the transfer instrument may still be used, and accepted by merchants, as if it was a payment card account for which a card had been issued and provided to the recipient at the time of use by the recipient of the transfer instrument. The only restriction being that, since the recipient has no card to present, the only merchants who can accept payment according to the invention are those who would normally accept that card online or as a MOTO transaction. Advantageously, however, the recipient can use the transfer instrument with a merchant who has no internet presence, but accepts MOTO transactions. Furthermore, if the recipient is aware of a merchant who will, despite the recipient being physically present, for some reason accept the transfer instrument information without a physical presentation of a payment card for the account, the recipient can even use the transfer instrument with that merchant, even if they do not accept MOTO transactions.

As part of the notification and/or redemption process, the recipient will have been informed of how to use the transfer instrument. Those instructions may be, for example, you can use the transfer instrument with any online merchant or mail order/telephone order merchant who accepts VISA cards. When you must provide payment, tell them you are paying with VISA with the transfer instrument number being given as the VISA account, your registration address and the expiration date being the last day of use for the transfer instrument. Thus, from the merchant perspective, the merchant can use the authorization infrastructure normally used to process VISA payment card purchases for VISA accounts where the cardholder has been issued and presented with a physically producible card. Thus, no additional infrastructure is required on the part of the merchant and the merchant does not have to follow any special redemption procedures like they would with a gift certificate or gift check.

Clearance/Settlement

Clearance and/or settlement of a purchase using a transfer instrument occurs in the same manner as is used to clear other payment card accounts for which a card has been issued and presented. From the perspective of the merchant, the charge is processed, and funds are received, in the normal manner using the merchant's acquiring bank, through the normal cardholder association clearance/settlement process. From the perspective of the issuing bank, actual funds for settlement with the acquiring bank will typically come from a demand deposit account (DDA) set up by the issuer of the transfer instruments.

Although the issuer of the transfer instrument could set up a separate account for storage of funds for each payment card account, administratively it is more desirable and advantageous to maintain as few accounts as possible for clearance/settlement purposes. Ideally, a single master DDA account will be used, with the database records providing the link between payment card account usage and the DDA account.

Alternatively, a separate account could be maintained for each different type of payment card account. For example, one DDA account for transfer instruments of the debit payment card account type and another for transfer instruments of the credit/charge payment card account type.

Thus, the issuer of the transfer instruments will be interposed between the purchaser and recipient for purposes of settlement and/or clearance since, in most instances, the purchaser will have settled his transaction with the transaction instrument issuer prior to the recipient using the transaction instrument with a merchant.

FIGS. 8 through 13 show state diagrams in the Uniform Modeling Language (UML) as developed by Rational Software Corp. (also known to those in the art as UML drawings). The state diagrams of FIGS. 8 through 13 collectively illustrate state transitions for another example embodiment operating in accordance with the invention, as considered from the perspective of the issuer or offeror of the transfer instrument.

Figure 20:
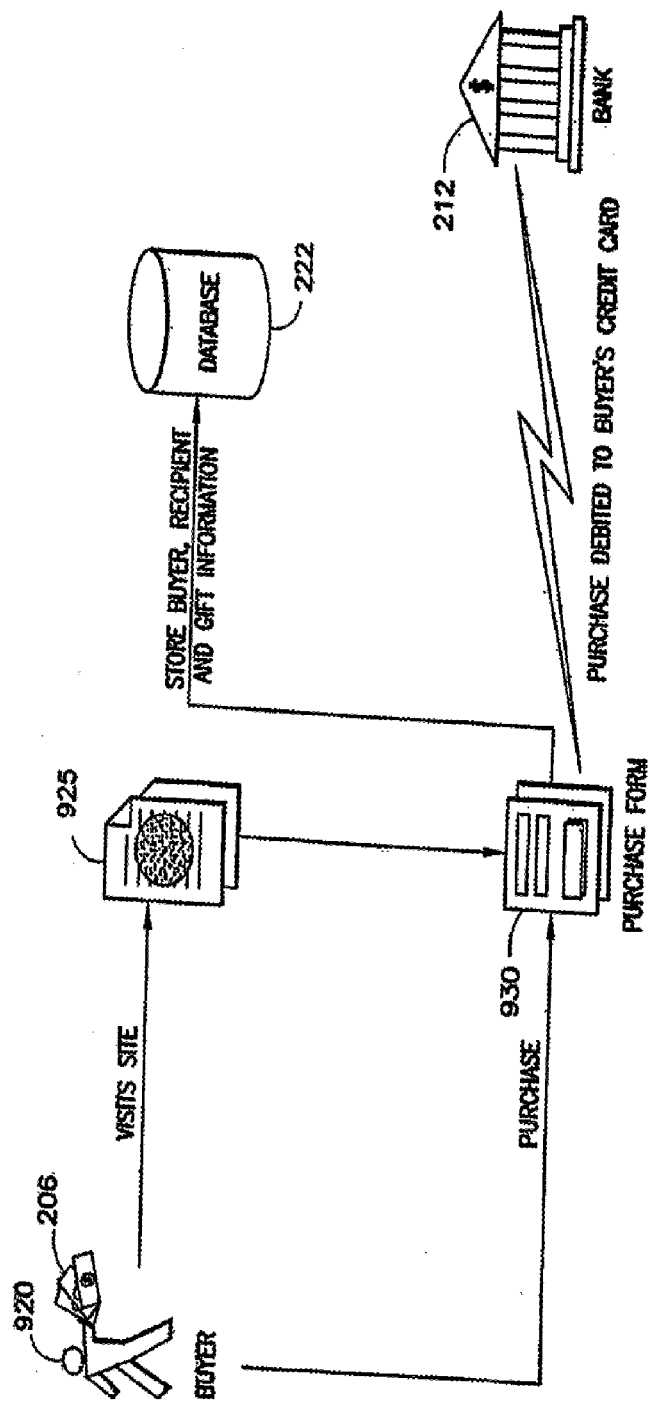
FIGS. 20, 21 and 22 are diagrams illustrating the steps involved in the purchase, notification and redemption of a transfer instrument in an example embodiment of the invention.
Figure 21:
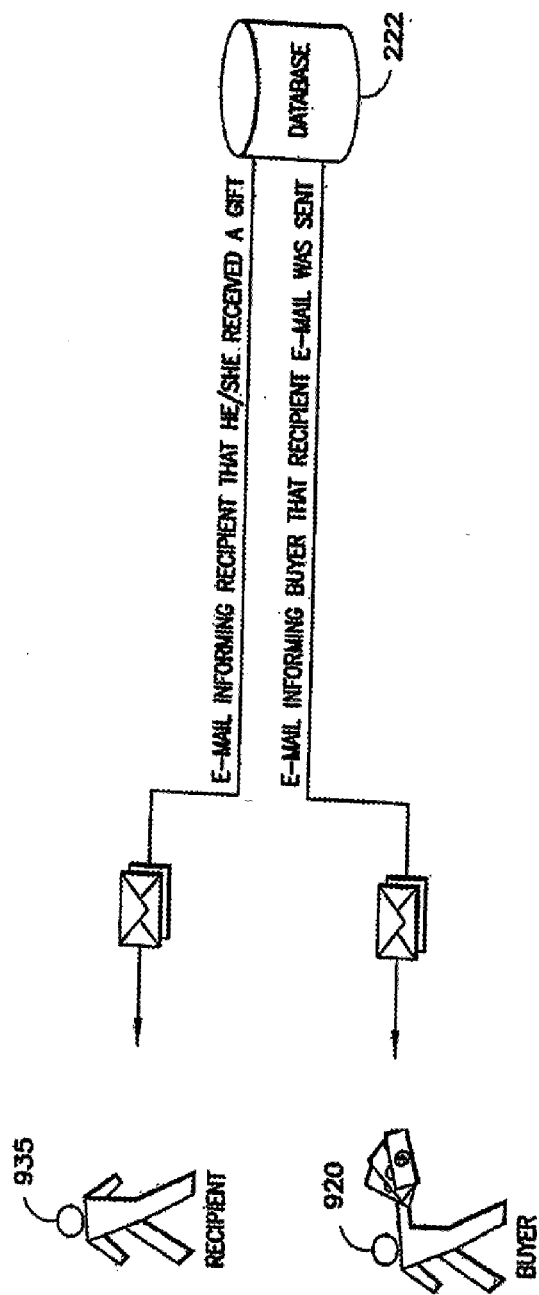
Figure 22:
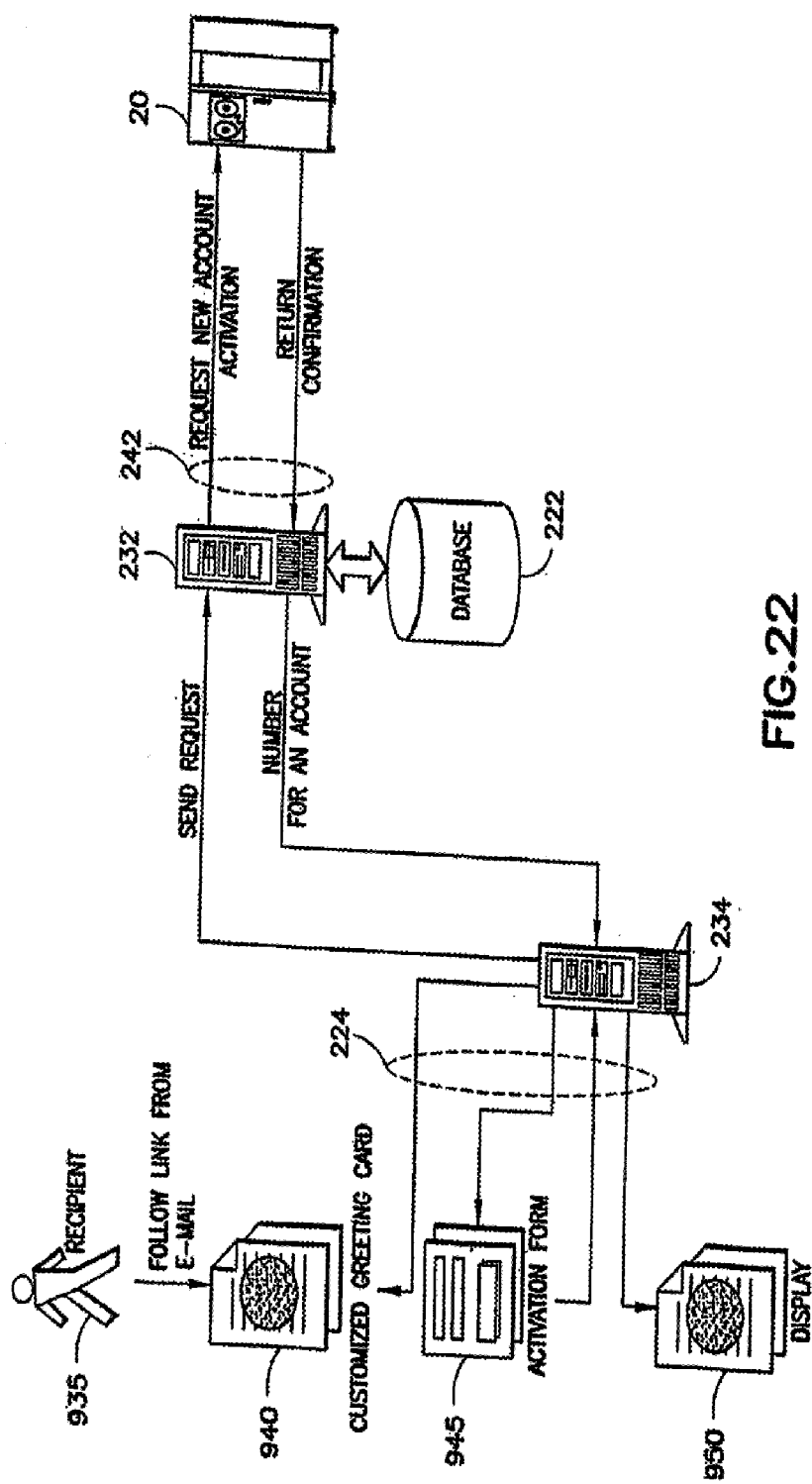

FIGS. 14 through 19 are high level flowcharts and FIGS. 20 through 22 are diagrams illustrating, an example set of transactions, in which a transfer instrument is purchased and activated. In this example, the issuer of transfer instruments acquires a group of debit type payment card accounts from MasterCard via an issuing bank. The issuing bank registers the accounts in the name of the transfer certificate issuer for record keeping purposes and sets the balance on the card to zero. The transfer certificate issuer obtains an IP address which will be accessed via the internet by prospective purchasers of the transfer instrument through a URL. The URL may be directly accessible by a purchaser and/or may be accessible by linking from a hypertext link on website of a third party. The prospective purchaser 920 connects to the home page 925 of the issuer indicated by the URL or IP address. The home page of the website is displayed and provides some basic explanation of the transfer instrument. If the purchaser 920 has previously purchased a transfer instrument, they are not a new user they have an established identifier which will allow them to log in. The log in allows a purchaser, who has been given the option to specify use notifications, to view those notifications on line as opposed to receiving an e-mail. The log in may further be used as a way to manage the size of the database since people can each purchase multiple transfer instruments, or can themselves also be recipients of transfer TO instruments, yet, due to the tabular nature of the database, a single master record may be maintained for that person. Thus when prompted to log in, the purchaser can provide, for example, the identifier, preferably a username and password. If the log in was unsuccessful, an error message will be returned along with another log in prompt. If the log in is successful, they will be presented with a few options.

If the person does not have an established log in, they will be directed to a page which will allow them to create one. The log in creation page will prompt for information which will be used to build a database record for the person. For example, the person may be prompted to provide one or more of the following: Username (or default such as the e-mail address), Password, Reconfirm password, Password Hint (used to see a forgotten password), Email address, Postal address (address_1, address_2, city, state, zip, country), Name (prefix, first, middle, last, suffix), Salutation/Form-of-Address (Mr./Ms.), and/or Age/Date of Birth. Once a log in is created, the prospective purchaser will be provided with the options page. The purchaser will then have the option of exiting, buying a transfer instrument, or performing maintenance. If the prospective purchaser selects exit, they are returned to the home page 925. If the prospective purchaser selects maintain account they will be directed to one or more account maintenance pages which may contain transfer instrument status, billing information, or options to modify, for example, notification parameters or change the designated recipient as a result of a non-delivery notification. Once maintenance is complete, the prospective purchaser is returned to the options page.

If the prospective purchaser selects buy, the prospective purchaser is provided with the available purchaser selectable parameters for the transfer instrument as part of a purchase form 930. Assume the prospective purchaser wishes to purchase transfer instruments for his niece and nephew as graduation presents. Since the niece is graduating from college and moving to a new town, the gift will be a credit type transfer instrument with a maximum line of credit of $500 which will be good for the months of August and September. The nephew is graduating from High School as class valedictorian, so his gift will be a $500 debit type transfer good for one year.

To purchase the gift for the niece, the prospective purchaser selects the options for credit type transfer instrument, $500 for the line of credit amount, a start date of August 1 and an expiration date of September 30. Since he is giving a credit transfer instrument, he elects to be notified of usage, including when and with what merchant(s), and to require the recipient (his niece) be notified in part by e-mail but to also connect to a website to receive the transfer instrument information and so a multimedia greeting can be displayed. The prospective purchaser 920 then selects a greeting from a set of available pre-created greetings or creates their A own customized greeting in text, audio, video or multimedia form, depending upon the system and purchaser's equipment and/or capabilities. Next the prospective purchaser 920 enters the niece's name and e-mail address into the form 930 and chooses any other desired options. Finally, the prospective purchaser 920 enters the payment information in this case for a VISA credit card (e.g. card identifier, account number and expiration date) in the appropriate places in the form and sends it. A preview of the transfer instrument is then provided which shows the greeting as it will appear to the niece and the text of the e-mail which will be sent. If everything is satisfactory, the purchaser 920 accepts. A new prompt is provided to allow purchase of another transfer instrument. Since the prospective purchaser 920 has not yet purchased the transfer instrument for the nephew, the purchase another option is selected. The prospective purchaser 920 is again returned to the available purchaser selectable parameters for the transfer instrument and purchase form 930. The selection proceeds in the same manner, except that a debit type transfer instrument is selected and a duration of one year is specified. The prospective purchaser 920 elects, in this case, to only receive notification that the transfer instrument has been used, but not when or where and to have the nephew notified exclusively by e-mail without any further action on the part of the nephew. After selecting any other available and desired options, the prospective purchaser 920 again provides the same payment information and previews the text of the e-mail which reads "You have been given a $500 graduation gift by your Uncle Bob. The gift is usable with any online merchant, mail order or telephone order merchant who accepts MasterCard. In order to use the gift, identify the payment method as MasterCard and provide the certificate number below as the account number. The gift is good for one year, so in making your purchase you should provide June of next year as the expiration date. Congratulations on your accomplishment!" Satisfied, the prospective purchaser 920 accepts and elects to not purchase another. At this point, the form information is transmitted to the issuer's server which extracts information for payment authorization and initiates an authorization request via its acquiring bank interface using the appropriate authorization infrastructure (e.g. VISA or CyberCash). If authorization is declined, the prospective purchaser 920 is prompted for alternate payment. If payment is accepted, information extracted from the form is transferred to the database server where the information will be used to create database records in the database 22 for each of the transfer instruments. No longer a prospective purchaser, the purchaser 920 has displayed a confirmation screen with a "receipt" which contains a tracking or identification number which identifies the transaction for record keeping purposes. The purchaser 920 then logs out and is returned to the home page 925.

In accordance with the notification process, since no delay was specified, the e-mail is immediately sent to the nephew. Upon notification to the transfer instrument offeror of a use by the nephew, a database 222 access is initiated. Since one or more fields corresponding to the post-purchase criteria are set, in this case, notification to the purchaser that the transfer instrument has been used, a notification of use is sent to the purchaser 920 by a selected delivery method such as e-mail or postal mail.

In the event an e-mail can not be delivered, notification is retried. After a number of tries fail, the purchaser 925 may be notified. The purchaser 925 will then have the option of having notification re-sent to the same person at a new e-mail address or by a different method, designating a new recipient or obtaining a refund.

The niece 935 is also notified with an e-mail on July 15, based upon the start date of Aug. 1, 1998. unlike the e-mail to the nephew, her e-mail merely states: "To: My Niece—From: Uncle Bob; I have given you a gift of credit charging, to a maximum of $500 per month, usable as you need it for two (2) months, between August 1 and September 30. To redeem the gift, double click on the URL below."

When the niece 935 double clicks on the URL which contains an identifier for the transfer instrument designated to her she is connected to a web page 940. If the identifier is valid or not locked because of some problem the system checks to see if the transfer instrument is already active. She is prompted to respond in an activation form 945 and provide information in order to register and activate. The web page 940 indicates that the information is maintained solely for purposes of preventing fraud, verifying a recipient's identity and/or enabling re-redemption if a transfer instrument is "lost". In particular, she is prompted for a username and a password. She is asked to reconfirm the password by typing it in again. She provides a "password hint" which may be used to refresh memory, should she ever forget her password. She then provides her e-mail address (which may be compared with the e- mail address given by the purchaser for her for security), her postal address, full name, for purposes of registering the transfer instrument in her name. This renders the payment card account associated with the transfer instrument solely usable in her name. Additionally, she is given the option of providing a date of birth and/or age which can be further used to verify her identity. Upon providing the required information, she is transferred to a redemption method page. The redemption method page provides her with the options of activating the transfer instrument or transferring the value to a credit card. Since she has been given a gift of credit, the second option is inactive. Had her gift been a fixed sum, she could have had that sum transferred, as if it was a refund, to a debit/credit/charge of her choosing (assuming it was one which the transfer instrument offeror was capable of crediting).

In the background, a database 222 search was conducted using the information she provided to determine if she currently has an active transfer instrument. If she did, the value/limit would have been changed or increased to reflect the new gift and/or the duration altered with the other parameters in the database being updated, so that any changed account parameters could be reflected in the account maintenance update provided to the issuing bank.

The database search determines that she does not have an active transfer instrument. (In an alternative embodiment this may have been determined earlier without a database 222 access by the fact that she was a new user). The account parameters are updated in the database 222 and, since the offeror has an arrangement for the real time supplying of accounts, the offeror initiates contact with the issuing bank via interface 242, provides the account registration information and necessary parameters, such as duration or expiration date, type of account, amount, etc. . . . and receives back an account number for the account from the system 220. The database 222 is updated to reflect the new account number and associate it with the records for the recipient 935.

The recipient 935 is then requested to verify their identity. This is also an optional step which may be dispensed with depending upon the particular system used or the value of the transfer instrument. Identity verification is performed, in the most convenient case, by her provision of a debit/credit/charge card number for which a zero value charge authorization can be put through to ensure that the recipient is who they purport to be. Alternatively, if the person does not have a debit/credit/charge card or refuses to provide one, a different form of identification may be used for verification, such as a checking account number, driver's license number or some other form of identification which may be used to verify a person's identity. Similarly, the verification may be performed offline or in some other manner, although doing so may introduce a delay between redemption and activation. Of course, if the identity check is employed and failed, the transfer instrument is not activated and the person may be directed to customer service for resolution.

Since the niece supplies a credit card number and it verifies, the database record for the transfer instrument is updated and the account has been transferred by the bank and now exists in the database 222 the transfer instrument is activated. The niece is then provided with a display 950 of the transfer instrument details in the template including: the account number, an indication of a $500 credit limit, usable as a MasterCard credit card, the expiration date of Sep. 30, 1998 and, if she has not already been presented with them, instructions on how to use the account.

The nephew elects to use the transfer instrument with a mail order company. He enters his order on the mail order form and checks the box labeled MasterCard, providing the transfer instrument number in the spaces for the account number and the expiration date of June 1999.

If the order total is less than the available balance when the mail order merchant processes the order and seeks authorization, the charge is authorized, the goods are shipped and the account debited for the amount of the purchase. If an account activity parameter is violated however, for example, if the total charge sought is more than the available balance, the charge authorization will fail and the nephew will be notified, similarly if the transfer certificate has expired because the duration has been exceeded the charge will be declined.

When the account is accessed, the database will indicate that a post-purchase parameter is set which requires notification of the Uncle of the use. This triggers an e-mail message to the Uncle indicating that "<tracking number> transfer instrument was used on <date> by <recipient>".

The niece uses the transfer instrument in late August to purchase access to an online concert via a website, for which the charge is $25. She similarly enters the charge as a MasterCard charge in the online form the website provides. Since the amount charged is less than the credit limit and available balance, the charge clears and the credit line is reduced by the amount of the charge. The usage similarly causes the database to notify the Uncle with a message "<tracking number> transfer instrument was used on <date> by <recipient> with <merchant>". At the end of the month, the payment card provided by the Uncle is charged the for the outstanding balance in the niece's transfer instrument account. The credit limit for the transfer instrument is then raised back to the charge limit of $500 for September. The process will be repeated again at the end of September except, because a use of the transfer instrument would violate an account activity parameter, the transfer instrument is locked and marked inactive. Depending upon the arrangement with the issuing bank, the account may also be purged from the database, or it may be retained for a period of time as inactive, in the event that the niece receives another transfer instrument of the same type.

Further Alternative Embodiments

In addition to the foregoing, it will be recognized that the invention is not limited to payment card accounts of the unsecured credit type. Where a secured credit type payment card account is used, the recipient may further be provided with the option of adding or paying funds which would result in the record for their transfer instrument having its credit line increased by the amount of the funds provided. In this manner, a person who lacks creditworthiness can, in effect, raise their usable credit limit as much as they can afford, over the gift value.

In this description we have shown and described a number of preferred embodiments of the invention, it being understood that the invention is capable of use in various other combinations, environments or applications. Similarly, it will be recognized that aspects of the invention are implemented by programming. Thus, reordering of steps, substitution of hardware components for software compatibility or speed, or variations created due to differences in programming languages and/or styles or other modifications are considered to be within the scope and spirit of the inventive concepts expressed herein. Accordingly, we intend for our invention to be defined and limited solely as set forth in the claims.

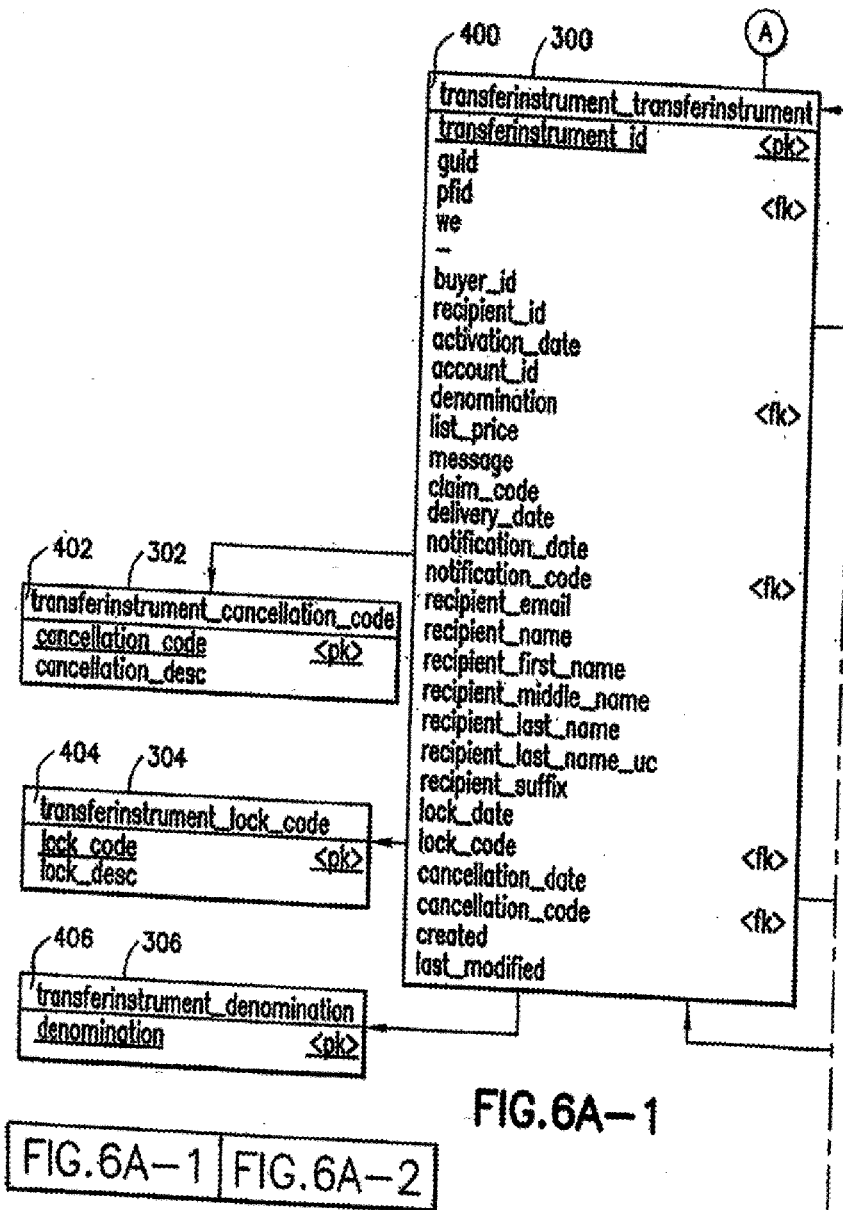

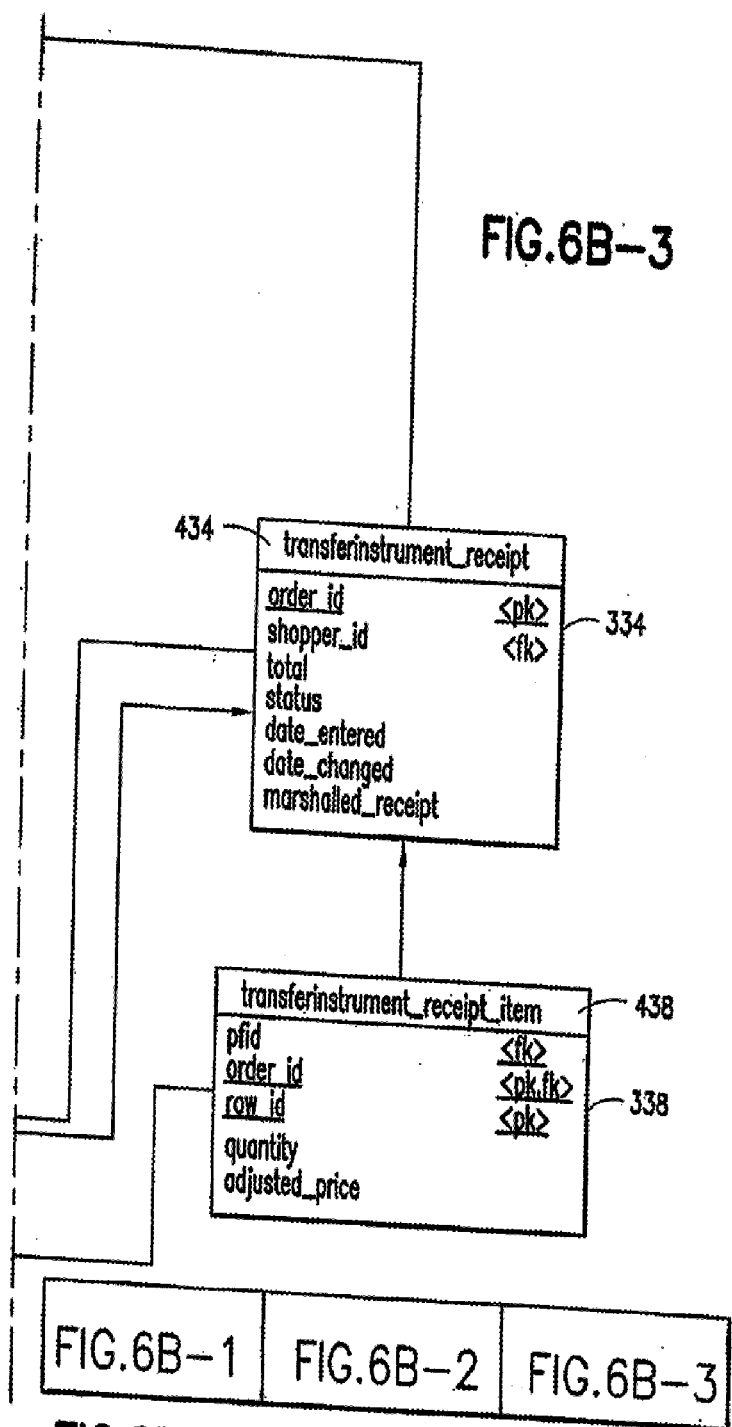

The invention claimed is:

1. A method performed by a transfer instrument issuer comprising:

acquiring a plurality of charge accounts, from an account issuer, of a type normally issued with an associated physically producible card which may be presented as evidence of an existing charge account, the physically producible cards bearing human readable account numbers and expiration dates, the plurality of charge accounts being capable of being gifted to a party, after acquisition;

receiving a request from a first party to gift a charge account to a second party having a name, without both the issuance and provision of a physical card for the charge account to the second party, the first party and the second party being different from each other the charge account being usable in the name of the second party at any merchant, unrelated to the transfer instrument issuer, who is capable of seeking authorization, using an authorization infrastructure, for purchases involving charge accounts for which the physically producible cards are issued, whether or not the physical cards evidencing the accounts are presented by purchasers when a purchase is made;

accepting an account parameter selected by the first party, informing the second party of the account by sending an e-mail to the second party, the e- mail containing a greeting selected by the first party and directing the second party to perform a specified action in order to cause an activation of the account with the transfer instrument issuer;

activating the account for usage by the second party according to the account parameter;

receiving an indication that the second party has made a purchase from a merchant, unrelated to the transfer instrument issuer entity, using the account; and undertaking a settling transaction involving the account with the issuing bank after the usage of the account by the second party without involvement of the first party.

2. The method of claim 1 further comprising:
providing a purchaser accessible interface via the world wide web through which the first party can present the request to gift the charge account to the second party.

3. The method of claim 1 further comprising:
establishing an account for storage of funds usable by the transfer instrument issuer for undertaking a settling transaction with the account issuer for settling an economic transaction associated with one of the plurality of charge accounts.

4. The method of claim 1 wherein the activating further comprises:
ensuring that the authorization infrastructure will authorize the purchase from the merchant as long as an account activity parameter is not violated.

5. A method performed by a transfer instrument issuer comprising:
a) receiving a request from a first party for a gift certificate for a second party having a name, the gift certificate being a computer-generated indication of a charge account, obtained by the transfer instrument issuer from an account issuer different from the transfer instrument issuer, but without both an issuance and provision of a physical card for the charge account or provision of a presentable gift certificate to the second party, the charge account:
i) being usable solely in the name of the second party;
ii) having an associated first party selectable account parameter; and
iii) being capable of having a purchase made using the account authorized using an authorization infrastructure of a card association associated with an account issuer;
b) informing the second party of the account; and
c) activating the account for usage by the second party.

6. The method of claim 5 further comprising:
acquiring a plurality of charge accounts from the account issuer and capable of being gifted, after acquisition.

7. The method of claim 5 further comprising:
accepting a backing payment from the first party.

8. The method of claim 5 further comprising:
receiving a selection of the account parameter from the first party, the selection being one of, a specified value, a maximum credit limit, a delivery date, a start date, an expiration date, a duration, a billing address, a location for funds from which charges by the second party will be paid, a notification method, or a usage notification arrangement.

9. The method of claim 5 wherein the informing further comprises:
sending an e-mail to the second party.

10. The method of claim 5 wherein the informing further comprises:
directing the second party to a website associated with transfer instrument issuer to initiate the activating of the charge account indicated by the gift certificate.

11. The method of claim 5 further comprising:
allowing the first party to select a greeting to the second party.

12. The method of claim 5 further comprising:
sending a thank you notification to the first party from the second party.

13. The method of claim 5 further comprising:
requiring the second party to take a specified action with the transfer instrument issuer before performing the activating.

14. The method of claim 5 wherein the informing comprises an online portion and an offline portion.

15. The method of claim 13 wherein the online portion comprises at least two parts, one of the parts involving a different medium than another of the parts.

16. The method of claim 5 wherein the receiving further comprises:
processing the request using information provided by the first party in an online purchase form.

17. The method of claim 5 further comprising:
providing an accessible URL address for facilitating the receiving the selection.

18. The method of claim 5 further comprising:
providing an accessible URL address for facilitating a response by the second party to the informing.

19. The method of claim 5 further comprising:
funding a DDA account held by the transfer instrument issuer associated with the charge account.

20. The method of claim 5 wherein the informing further comprises:

providing an online display for viewing by the second party.

21. The method of claim 5 wherein the charge account is one of a MasterCard or VISA account and a transaction involving the second party and the charge account is authorized in the same manner as would be done for a mail order/telephone order purchase transaction involving MasterCard or VISA accounts for which physical cards have been issued.

22. The method of claim 5 wherein b) occurs at substantially the same time as c).

23. The method of claim 5 wherein c) occurs before an indication is received that b) is complete.

24. The method of claim 5 wherein a), b) and c) occur in sequence.

25. A method performed by a transfer instrument issuer comprising:
   a) making an instrument, of a purchaser selectable value, available for purchase online by a first party in a name of a second party, a purchase of which will result in the transfer instrument issuer maintaining a payment card account associated with the second party, although no physical card is both issued for the account and provided to the second party at a time when the second party uses the payment card account, the payment card account being maintainable by the transfer instrument issuer so that when an economic transaction with a merchant, other than the transfer instrument issuer, occurs in accordance with the instrument parameters, the economic transaction will be authorized using the authorization infrastructure of a card association authorization entity normally used to authorize transactions involving a physical payment card account; and
   b) invoking a notification procedure in response to the purchase.

26. The method of claim 25 wherein the payment card account is one of:
   i) a credit card account obtained from an account issuer different from the transfer instrument issuer whereby an outstanding balance due need not necessarily be paid at the end of a billing period;
   ii) a debit card account obtained from an account issuer different from the transfer instrument issuer whereby at the time of the economic transaction with the merchant, an amount for the economic transaction is transferred from the payment card account held by the transfer instrument issuer to the merchant; or
   iii) a charge card account obtained from an account issuer different from the transfer instrument issuer whereby an account balance must be paid in full at the end of a billing period.

27. The method of claim 26 wherein the invoking is followed by sending an e-mail to the second party.

28. The method of claim 27 further including executing a process which will construct a transfer instrument according to a template selected by the first party.

29. The method of claim 26 further comprising acting according to a post-purchase criteria.

30. The method of claim 29 wherein the acting includes one of:
   a) informing the first party that a use of the payment card account has occurred;
   b) informing the first party of when a use of the payment card account has occurred; or
   c) identifying the merchant to the first party.

31. The method of claim 26 further comprising:
   allowing the second party to specify a criterion related to a use of the payment card.

32. The method of claim 26 further comprising:
   providing redemption instructions to the second party.

33. A method performed by a transfer instrument issuer comprising:
   issuing, to a recipient, an online certificate which is linked to a national card account of a plurality of national card accounts obtained by the transfer instrument issuer from an account issuer different from the transfer instrument issuer, without both issuing and providing a physical card for the national card account to the recipient of the online certificate, the online certificate having been purchased by a purchaser, who is not also the recipient, and containing all information necessary for the purchase of at least one of goods or services from any merchant who is capable of processing economic transactions involving one of the plurality of national card accounts for which a physical card has issued, but without presentment of the physical card.

34. A method performed by a transfer instrument issuer of providing for purchase of a gift comprising:
   a) assigning an electronic record representing a credit card account to a first person at the request of a second person, upon tender by the second person of a request to charge a credit card belonging to the second person in amount at least as great as a maximum credit limit to be available for the first person when a purchase is made by the first person as a gift of the second person using the credit card account, the credit card account having been obtained by the transfer instrument issuer from an account issuer different from the transfer instrument issuer, the credit card account being independent of any account associated with the credit card belonging to the second person and being usable by the first person in the first person's name and with no physical card for the credit card account being both issued and provided to the first person at the time:
      i) the purchase is made using the account,
      ii) an authorization for the purchase is sought by a merchant using the authorization infrastructure, and
      iii) an approval is received by the merchant over the authorization infrastructure, all occur.

35. A gift of credit method performed by a transfer instrument issuer comprising:
   a) receiving an online request from a first party to transfer credit, as a gift, to a second party;
   b) charging a credit card belonging to the first party in a first amount;
   c) assigning a credit card account to a second party having a credit limit related to the first amount, obtained by the transfer instrument issuer from an issuing bank the credit card account being independent of the credit card belonging to the first party, the credit card account being one of a plurality of credit card accounts of a type wherein:
      i) physical cards are issued to people named on the accounts,
      ii) the physical cards are usable to make a purchase on credit of at least one of goods or services, and
      iii) authorization of charges to the accounts are performed using an authorization infrastructure of a card association of which the bank is a member;
   d) informing the second party of the credit card account, the credit card account being usable by the second party in the second party's name without any financial liability being borne by the first party as a result of a use of the credit card account, and no physical card for the credit card account being both issued and provided to the second party at the time an authorization for an economic transaction between the second party and a merchant unrelated to the transfer instrument issuer is performed, using the authorization infrastructure.

36. A method performed by an account issuer comprising:
a) providing a plurality of zero value debit card accounts to a transfer entity, that are assignable to a user party at the request of a requestor party, the accounts being of a type wherein
   i) physical cards are issued to people named on the accounts,
   ii) the physical cards are usable to purchase at least one of goods or services,
   iii) authorization of uses of the accounts are performed using a card association authorization infrastructure, and
   iv) balances in the accounts are debited as a result of the purchase of the at least one of goods or services,
an electronically represented assignment from the transfer entity to the user party to occur upon tender by the requestor party of an amount at least as great as a maximum value to be available when a purchase is made using the account, the account being usable by the second party in the second party's name and no physical card for the account being both issued and provided to the second party at the time an authorization is performed, using the card association authorization infrastructure, as a result of the second party purchasing one of goods or services using the account.

37. The method of claim 36 comprising the further step of:
b) authorizing a purchase transaction involving the user party, a retail merchant independent from the transfer entity and the account.

38. A method performed by an account issuer comprising:
a) providing a plurality of zero balance credit card accounts to a transfer entity assignable to a user party at the request of a requestor party, the accounts being of a type wherein
   i) physical cards are issued to people named on the accounts,
   ii) the physical cards are usable to purchase at least one of goods or services on credit, and
   iii) authorization of charges to the accounts are performed using a card association authorization infrastructure, and
   iv) credit is extended as a result of the purchase of the at least one of goods or services using the accounts unless there is an offsetting balance in the account at the time of posting,
an electronically represented assignment from the transfer entity to the user party to occur upon tender by the requestor party of an approval to charge a major credit card of the third party, in an amount at least as great as a maximum credit line to be available for the account when a purchase is made using the account, the account being usable by the second party in the second party's name and no physical card for the account being both issued and provided to the second party at the time an authorization is performed, using the authorization infrastructure, as a result of the second party purchasing one of goods or services using the account.

39. The method of claim 38 comprising the further step of:
b) noting a clearing transaction for the account as a result of a usage of the account by the user party.

40. A system comprising:
a database having at least one table, and
a processor coupled to the database, the database being configured to, under control of the processor, maintain a record of a payment card account held by a transfer instrument issuer, and registered to a first person at the request of a second person, and for which, at no time at, or before, a time the second person buys from a merchant unrelated to the transfer instrument issuer and pays by referencing the payment card account, no physical card for the payment card account will have been provided to the second person.

41. A system comprising:
an interface to the internet, the interface being correlated to an IP address for a webpage; and
a processor capable of displaying the webpage to a person connected to the internet, the webpage including a link which, when selected, will connect the person to a server having a communicative relationship with a database, the database being configured to maintain a records of payment card accounts held by a transfer instrument issuer and obtained from an issuer entity unrelated to the transfer instrument issuer, the accounts being of a type for which a physical card normally is provided to an individual to whom an account is registered, one of the payment card accounts being registerable to a first person at the request of a second person, the payment card account being maintained such that, at the time the second person buys from a merchant unrelated to the transfer instrument issuer and provides payment by referencing the payment card account, no physical card for the payment card account will have been provided to the second person.

42. A transfer instrument comprising:
a processor accessible storage media; and
a database record located on the storage media, the database record including a plurality of fields, the fields being configured for holding data which will allow a person to make a purchase, using a payment card account indicated by the record, as if the payment card account had an associated physically presentable card in a name of the person even though, at or before a time when the payment card account the account is used to make the purchase, no physical card will have been both issued and physically provided to the person, the payment card account being held by a transfer instrument issuer and obtained by the transfer instrument issuer from an issuer entity unrelated to the transfer instrument issuer.

43. A method comprising:
creating an electronic record which represents a converting of a first payment card account of a first type, for which a payment card has issued and been provided to a first person, the first payment card account being usable solely in a name of the first person, into a second payment card account of a second type, the second payment card account being independent of the first payment card account and usable by a second person, having a name different than the name of the first person, without issuing and providing a physical card for the second payment card account of the second type to the second person at a time of, or prior to, the second person uses their second payment card account of the second type in a purchase transaction with a merchant unrelated to an issuer entity for the second payment card account.

* * * * *

UNITED STATES PATENT AND TRADEMARK OFFICE
CERTIFICATE OF CORRECTION

PATENT NO. : 7,010,512 B1 Page 1 of 28
APPLICATION NO. : 09/188810
DATED : March 7, 2006
INVENTOR(S) : Matthew J. Gillin et al.

It is certified that error appears in the above-identified patent and that said Letters Patent is hereby corrected as shown below:

ENTER Formal Drawings containing FIGS, 1-5, 6A, 6A-1, 6A-2, 6B, 6B-1, 6B-2, 6B-3, 7A, 7A-1, 7A-2, 7B, and 8-22

Signed and Sealed this

Twenty-eighth Day of November, 2006

JON W. DUDAS
*Director of the United States Patent and Trademark Office*

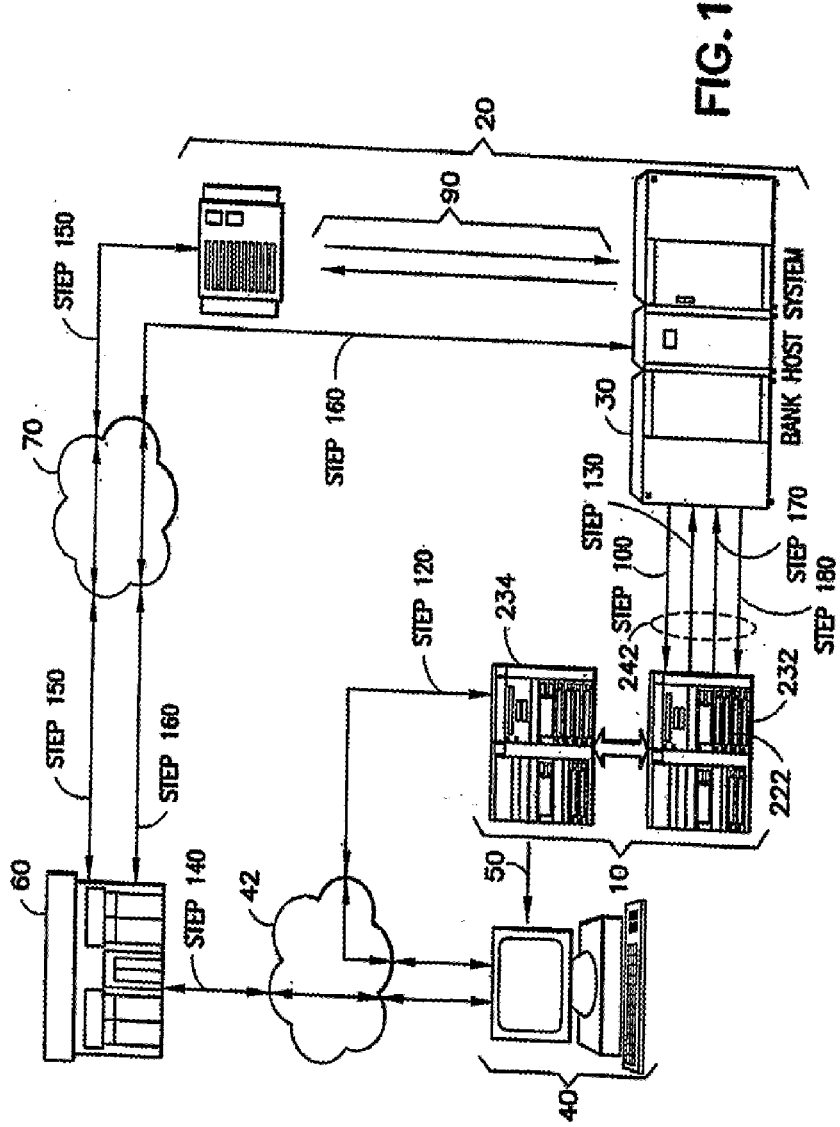

| ACCOUNT # | LIMIT | EXPIRE |
|---|---|---|
| ACCOUNT 1 | | |
| ACCOUNT 2 | | |
| ACCOUNT 3 | | |
| . . . | | |
| . . . | | |
| . . . | | |
| ACCOUNT n | | |

FIG.4

| ACCOUNT # | EXP | ACTV | LMT | BAL | NOT1 | ... | NOTn | PUR1 | ... | PURn | BLD | TYPE | USE1 | ... | USEn |
|---|---|---|---|---|---|---|---|---|---|---|---|---|---|---|---|
| ACCOUNT 1 | | | | | | | | | | | | | | | |
| ACCOUNT 2 | | | | | | | | | | | | | | | |
| ACCOUNT 3 | | | | | | | | | | | | | | | |
| . | | | | | | | | | | | | | | | |
| . | | | | | | | | | | | | | | | |
| ACCOUNT n | | | | | | | | | | | | | | | |

FIG. 5